(12) United States Patent
Kooznetsoff

(10) Patent No.: US 11,748,439 B2
(45) Date of Patent: Sep. 5, 2023

(54) COMPUTER-AIDED METHODS AND SYSTEMS FOR DISTRIBUTED COGNITION OF DIGITAL CONTENT COMPRISED OF KNOWLEDGE OBJECTS

(71) Applicant: Big Idea Lab, Inc., Castlegar (CA)

(72) Inventor: Gary Kenneth Kooznetsoff, Castlegar (CA)

(73) Assignee: Big Idea Lab, Inc., Castlegar (CA)

( * ) Notice: Subject to any disclaimer, the term of this patent is extended or adjusted under 35 U.S.C. 154(b) by 184 days.

(21) Appl. No.: 17/308,040

(22) Filed: May 4, 2021

(65) Prior Publication Data
US 2021/0342408 A1 Nov. 4, 2021

Related U.S. Application Data

(60) Provisional application No. 63/019,827, filed on May 4, 2020.

(51) Int. Cl.
*G06F 16/958* (2019.01)
*G06F 16/906* (2019.01)
(Continued)

(52) U.S. Cl.
CPC .......... *G06F 16/958* (2019.01); *G06F 16/906* (2019.01); *G06F 16/908* (2019.01); *G06N 5/022* (2013.01)

(58) Field of Classification Search
CPC .... G06F 16/908; G06F 16/906; G06F 16/958; G06Q 10/101; G06Q 50/01; G06N 5/022
See application file for complete search history.

(56) References Cited

U.S. PATENT DOCUMENTS

| 7,669,238 | B2 * | 2/2010 | Fee | .......................... | G06F 21/51 |
| | | | | | 713/170 |
| 10,771,932 | B1 * | 9/2020 | Tai | .......................... | H04W 4/50 |

(Continued)

OTHER PUBLICATIONS

International Search Report for Application No. PCT/US2021/030742 dated Jul. 9, 2021, 14 pgs.

*Primary Examiner* — Etienne P Leroux
(74) *Attorney, Agent, or Firm* — SEED INTELLECTUAL PROPERTY LAW GROUP LLP

(57) ABSTRACT

Methods and systems for distributed cognition of digital content include receiving submissions from community members regarding a knowledge object. Each community member has a reputation value and each submission includes an evaluation value representing an evaluation of the knowledge object by the community member. A consensus evaluation is determined based on a calculated combination of the evaluation values in the submissions received and the reputation values of the respective community members who submitted the submissions. While submissions are being received, the consensus evaluation of the knowledge object is iteratively updated based on submissions received, being a calculated combination of the evaluation values in the submissions received and the reputation values of the respective community members who submitted the submissions. Additionally, the reputation value for each community member who submitted the submissions is iteratively updated based on a determined contribution of the respective community member's submission to the updated consensus evaluation.

20 Claims, 28 Drawing Sheets

(51) Int. Cl.
  *G06F 16/908* (2019.01)
  *G06N 5/02* (2023.01)
  *G06N 5/022* (2023.01)

(56) References Cited

U.S. PATENT DOCUMENTS

| | | | |
|---|---|---|---|
| 11,526,773 B1* | 12/2022 | Czuba | G06N 20/10 |
| 2007/0291657 A1* | 12/2007 | Smith | H04L 47/2416 |
| | | | 370/252 |
| 2008/0077517 A1 | 3/2008 | Sappington | |
| 2008/0248873 A1* | 10/2008 | Lang | G07F 17/32 |
| | | | 463/43 |
| 2009/0003309 A1* | 1/2009 | Bawcutt | H04L 45/00 |
| | | | 370/254 |
| 2012/0221460 A1* | 8/2012 | Chang | G06Q 40/04 |
| | | | 705/37 |
| 2014/0060371 A1* | 3/2014 | Kim | F42C 15/40 |
| | | | 102/402 |
| 2014/0136256 A1* | 5/2014 | Brown | G06Q 10/063112 |
| | | | 705/7.14 |
| 2015/0248647 A1* | 9/2015 | Goel | G06Q 10/1053 |
| | | | 705/321 |
| 2016/0155161 A1 | 6/2016 | Reisman | |
| 2017/0308907 A1* | 10/2017 | Clark | G06Q 30/018 |
| 2018/0360295 A1* | 12/2018 | Boucher | G16H 30/20 |
| 2019/0026377 A1* | 1/2019 | Paris | G06F 3/0482 |
| 2019/0243877 A1* | 8/2019 | Ball | G09B 5/125 |
| 2019/0339832 A1* | 11/2019 | D'Angelo | G06F 3/0482 |
| 2020/0013092 A1* | 1/2020 | Liu | G06Q 30/0271 |

\* cited by examiner

AGENT KNOWLEDGE OBJECT 1

How much support or opposition is there between the agent above and the agent below?

104 Agents are similar / related

AGENT KNOWLEDGE OBJECT 2

Yesterday's Nature article further supports our lab's previously published theory on the nature of reality. I think it is fair to say that Joe's competing ideas published last year are dead.

FIG. 5

To submit, please confirm your "good intentions".

*"Good Intentions" Matter:*

☐ My words are not divisive to "the common good". More details.

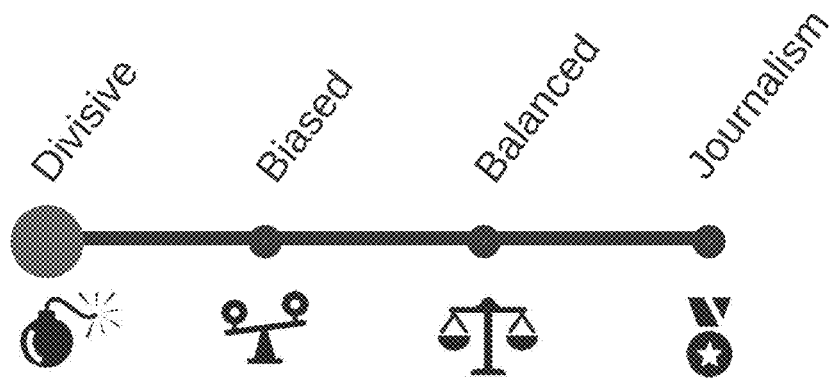

Author is being divisive to the common good. Select all reasons that apply:

- [x] Words are promoting hate, violence, or suffering
- [ ] Words are purposefully deceptive or manipulative
- [ ] Words are assigning a judgment label with an intent to reduce an adversary to something less than they are (labelling / bucketing / de-humanizing)
- [ ] Words are attempting to demonstrate author's "cleverness" or "superiority" at the expense of others
- [ ] Words are expressing opinions (at the expense of others) intended to demonstrate the author's good character or the moral correctness of author's position (righteousness / virtue signalling)
- [ ] Words are attacking a person's character rather than the issue -- particularly popular when one can't find fault in the content of the competing message. ("ad hominem" attack)
- [ ] Words are taking another person's argument or point, and distorting it or exaggerating it in an extreme way. Then, attacking the extreme distortion as if "that" really was the claim that the other person is making. ("straw man" argument)
- [x] Words are divisive to "the common good" in other ways

34

Please explain

| # | COMMUNITY MEMBER (CM) | CM SUBMISSION (CMS) | | CONSENSUS EVALUATION AFTER CM SUBMIT (CE.AS) & BEFORE CM SUBMIT (CE.BS) | | CONSENSUS EVALUATION (EVERYONE BUT ME) | DISTANCES | | IMPACT | |
|---|---|---|---|---|---|---|---|---|---|---|
| | CM.REPUTATION | CMS.EVAL | CMS.CONFID | CE.AS | CE.BS | CE.EBM | From CMS.EVAL to CE.BS | From CMS.EVAL to CE.EBM | CM's Contribution | Impact to CM's Reputation |
| 1 | 0.7 | 0.64 | 0.1 | 0.5 | 0.50 | 0.50 | 0.14 | 0.14 | 0.00 | 0.000 |
| A | B | C | D | E | F | G | H | I | J | K |

FIG. 14A

| | COMMUNITY MEMBER (CM) | CM SUBMISSION (CMS) | | CONSENSUS EVALUATION AFTER CM SUBMIT (CE.AS) & BEFORE CM SUBMIT (CE.BS) | | CONSENSUS EVALUATION (EVERYONE BUT ME) | DISTANCES | | IMPACT | |
|---|---|---|---|---|---|---|---|---|---|---|
| # | CM.REPUTATION | CMS.EVAL | CMS.CONFID | CE.AS | CE.BS | CE.EBM | From CMS.EVAL to CE.BS | From CMS.EVAL to CE.EBM | CM's Contribution | Impact to CM's Reputation |
| 1 | 0.7 | 0.64 | 0.1 | 0.5 | 0.50 | 0.40 | 0.14 | 0.24 | -0.10 | (0.010) |
| 2 | 0.4 | 0.4 | 0.5 | 0.64 | 0.64 | 0.64 | 0.24 | 0.24 | 0.00 | 0.000 |
| A | B | C | D | E | F | G | H | I | J | K |

FIG. 14B

| # | COMMUNITY MEMBER (CM) | CM SUBMISSION (CMS) | | CONSENSUS EVALUATION AFTER CM SUBMIT (CE.AS) & BEFORE CM SUBMIT (CE.BS) | | CONSENSUS EVALUATION (EVERYONE BUT ME) | DISTANCES | | IMPACT | |
|---|---|---|---|---|---|---|---|---|---|---|
|   | CM.REPUTATION | CMS.EVAL | CMS.CONFID | CE.AS | CE.BS | CE.EBM | From CMS.EVAL to CE.BS | From CMS.EVAL to CE.EBM | CM's Contribution | Impact to CM's Reputation |
| 1 | 0.7 | 0.64 | 0.1 | 0.5 | 0.50 | 0.30 | 0.14 | 0.34 | -0.20 | (0.020) |
| 2 | 0.4 | 0.4 | 0.5 | 0.64 | 0.64 | 0.32 | 0.24 | 0.08 | 0.16 | 0.081 |
| 3 | 0.1 | 0.1 | 1 | 0.36 | 0.46 | 0.46 | 0.36 | 0.36 | 0.00 | 0.000 |
| A | B | C | D | E | F | G | H | I | J | K |

FIG. 14C

| | COMMUNITY MEMBER (CM) | CM SUBMISSION (CMS) | | CONSENSUS EVALUATION AFTER CM SUBMIT (CE.AS) & BEFORE CM SUBMIT (CE.BS) | | CONSENSUS EVALUATION (EVERYONE BUT ME) | DISTANCES | | IMPACT | |
|---|---|---|---|---|---|---|---|---|---|---|
| # | CM.REPUTATION | CMS.EVAL | CMS.CONFID | CE.AS | CE.BS | CE.EBM | From CMS.EVAL to CE.BS | From CMS.EVAL to CE.EBM | CM's Contribution | Impact to CM's Reputation |
| 1 | 0.7 | 0.64 | 0.1 | 0.5 | 0.50 | 0.35 | 0.14 | 0.29 | -0.15 | (0.015) |
| 2 | 0.4 | 0.4 | 0.5 | 0.64 | 0.64 | 0.40 | 0.24 | 0.00 | 0.24 | 0.119 |
| 3 | 0.1 | 0.1 | 1 | 0.46 | 0.46 | 0.50 | 0.36 | 0.40 | -0.04 | (0.039) |
| 4 | 0.3 | 0.85 | 0.1 | 0.40 | 0.36 | 0.36 | 0.49 | 0.49 | 0.00 | 0.000 |
| A | B | C | D | E | F | G | H | I | J | K |

FIG. 14D

| # | COMMUNITY MEMBER (CM) | CM SUBMISSION (CMS) | | CONSENSUS EVALUATION AFTER CM SUBMIT (CE.AS) & BEFORE CM SUBMIT (CE.BS) | | CONSENSUS EVALUATION (EVERYONE BUT ME) | DISTANCES | | IMPACT | |
|---|---|---|---|---|---|---|---|---|---|---|
| | CM.REPUTATION | CMS.EVAL | CMS.CONFID | CE.AS | CE.BS | CE.EBM | From CMS.EVAL to CE.BS | From CMS.EVAL to CE.EBM | CM's Contribution | Impact to CM's Reputation |
| 1 | 0.7 | 0.64 | 0.1 | 0.5 | 0.50 | 0.52 | 0.14 | 0.12 | 0.02 | 0.002 |
| 2 | 0.4 | 0.4 | 0.5 | 0.64 | 0.64 | 0.60 | 0.24 | 0.20 | 0.04 | 0.020 |
| 3 | 0.1 | 0.1 | 1 | 0.46 | 0.46 | 0.62 | 0.36 | 0.52 | -0.16 | (0.158) |
| 4 | 0.3 | 0.85 | 0.1 | 0.36 | 0.36 | 0.52 | 0.49 | 0.33 | 0.15 | 0.015 |
| 5 | 0.4 | 0.8 | 0.5 | 0.53 | 0.40 | 0.40 | 0.40 | 0.40 | 0.00 | 0.000 |
| A | B | C | D | E | F | G | H | I | J | K |

FIG. 14E

| | COMMUNITY MEMBER (CM) | CM SUBMISSION (CMS) | | | CONSENSUS EVALUATION AFTER CM SUBMIT (CE.AS) & BEFORE CM SUBMIT (CE.BS) | | | | CONSENSUS EVALUATION (EVERYONE BUT ME) | | DISTANCES | | IMPACT | |
|---|---|---|---|---|---|---|---|---|---|---|---|---|---|---|
| | | | | | | | | | | | | | | 1 |
| | | | | | | | | | | | | | | 2 |
| # | CM.REPUTATION | CMS.X | CMS.Y | CMS.CONFID | CE.AS.X | CE.AS.Y | CE.BS.X | CE.BS.Y | CE.EBM.X | CE.EBM.Y | From CMS to CE.BS | From CMS to CE.EBM | CM's Contribution | Impact to CM's Reputation |
| | | | | | | | | | | | | | | 3 |
| | | | | | | | | | | | | | | 4 |
| | | | | | | | | | | | | | | 5 |
| | | | | | | | | | | | | | | 6 |
| | | | | | | | | | | | | | | 7 |
| | | | | | | | | | | | | | | 8 |
| 1 | 0.7 | 0.7 | 0.6 | 1 | 0.5 | 0.5 | 0.50 | 0.50 | 0.71 | 0.61 | 0.22 | 0.02 | 0.21 | 0.208 |
| 2 | 0.4 | 0.9 | 0.7 | 0.5 | 0.70 | 0.60 | 0.70 | 0.60 | 0.67 | 0.59 | 0.22 | 0.26 | -0.04 | (0.018) |
| 3 | 0.1 | 0.1 | 0.1 | 1 | 0.74 | 0.62 | 0.74 | 0.62 | 0.76 | 0.65 | 0.83 | 0.86 | -0.03 | (0.028) |
| 4 | 0.3 | 0.85 | 0.5 | 0.1 | 0.68 | 0.57 | 0.68 | 0.57 | 0.70 | 0.61 | 0.18 | 0.19 | 0.00 | (0.000) |
| 5 | 0.4 | 0.8 | 0.8 | 0.5 | 0.70 | 0.61 | 0.68 | 0.57 | 0.68 | 0.57 | 0.26 | 0.26 | 0.00 | 0.000 |
| A | B | C | D | E | F | G | H | I | J | K | L | M | N | O |

FIG. 15

| COMMUNITY MEMBER (CM) | | CM SUBMISSION (CMS) | | | | CONSENSUS EVALUATION AFTER CM SUBMIT (CE.AS) & BEFORE CM SUBMIT (CE.BS) | | | | | | | CONSENSUS EVALUATION (EVERYONE BUT ME) | | | DISTANCES | | IMPACT | |
|---|---|---|---|---|---|---|---|---|---|---|---|---|---|---|---|---|---|---|---|
| # | CM.REPUTATION | CMS.INTENT | CMS.X | CMS.Y | CMS.CONFID | CE.AS. INTENT | CE.AS.X | CE.AS.Y | CE.BS. INTENT | CE.BS.X | CE.BS.Y | CE.EBM. INTENT | CE.EBM.X | CE.EBM.Y | From CMS to CE.BS | From CMS to CE.EBM | CM's Contribution | Impact to CM's Reputation |
| 1 | 0.7 | 0.6 | 0.7 | 0.6 | 1 | 0.60 | 0.70 | 0.60 | 0.50 | 0.50 | 0.50 | 0.32 | 0.69 | 0.59 | 0.24 | 0.28 | -0.04 | (0.038) |
| 2 | 0.4 | 0.4 | 0.9 | 0.7 | 0.5 | 0.56 | 0.74 | 0.62 | 0.60 | 0.70 | 0.60 | 0.49 | 0.66 | 0.58 | 0.30 | 0.29 | 0.01 | 0.006 |
| 3 | 0.1 | 0.1 | 0 | 0 | 1 | 0.51 | 0.67 | 0.56 | 0.56 | 0.74 | 0.62 | 0.51 | 0.76 | 0.65 | 1.07 | 1.08 | -0.01 | (0.008) |
| 4 | 0.3 | 0.6 | 0.85 | 0.5 | 0.1 | 0.51 | 0.68 | 0.56 | 0.51 | 0.67 | 0.56 | 0.48 | 0.69 | 0.60 | 0.21 | 0.23 | -0.02 | (0.002) |
| 5 | 0.4 | 0.3 | 0.8 | 0.8 | 0.5 | 0.48 | 0.70 | 0.60 | 0.51 | 0.68 | 0.56 | 0.51 | 0.68 | 0.56 | 0.35 | 0.35 | 0.00 | 0.000 |
| A | B | C | D | E | F | G | H | I | J | K | L | M | N | O | P | Q | R | S |

FIG. 16

| | COMMUNITY MEMBER (CM) | CM SUBMISSION (CMS) | | | CONSENSUS EVALUATION AFTER CM SUBMIT (CE.AS) & BEFORE CM SUBMIT (CE.BS) | | | | CONSENSUS EVALUATION (EVERYONE BUT ME) | | DISTANCES | | IMPACT | |
|---|---|---|---|---|---|---|---|---|---|---|---|---|---|---|
| # | CM.REPUTATION | CMS.SCALE | CMS.REVERSE | CMS.CONFID | CE.AS. SCALE | CE.AS. REVERSE | CE.BS. SCALE | CE.BS. REVERSE | CE.EBM. SCALE | CE.EBM. REVERSE | From CMS to CE.BS | From CMS to CE.EBM | CM's Contribution | Impact to CM's Reputation |
| | | | | | 0.5 | 0 | | | | | | | | |
| 1 | 0.7 | 0.7 | 0 | 1 | 0.70 | 0.00 | 0.50 | 0.00 | 0.71 | 0.43 | 0.20 | 0.43 | -0.23 | (0.234) |
| 2 | 0.4 | 0.9 | 0 | 0.5 | 0.74 | 0.00 | 0.70 | 0.00 | 0.67 | 0.22 | 0.20 | 0.32 | -0.12 | (0.062) |
| 3 | 0.1 | 0.1 | 0 | 1 | 0.68 | 0.00 | 0.74 | 0.00 | 0.76 | 0.20 | 0.64 | 0.69 | -0.04 | (0.043) |
| 4 | 0.3 | 0.85 | 1 | 0.1 | 0.68 | 0.03 | 0.68 | 0.00 | 0.70 | 0.17 | 1.01 | 0.85 | 0.17 | 0.017 |
| 5 | 0.4 | 0.8 | 1 | 0.5 | 0.70 | 0.19 | 0.68 | 0.03 | 0.68 | 0.03 | 0.98 | 0.98 | 0.00 | 0.000 |
| A | B | C | D | E | F | G | H | I | J | K | L | M | N | O |

FIG. 17

COMPUTER-AIDED METHODS AND SYSTEMS FOR DISTRIBUTED COGNITION OF DIGITAL CONTENT COMPRISED OF KNOWLEDGE OBJECTS

BACKGROUND

Technical Field

The present disclosure is directed to computer-aided methods and systems that assist a community in developing a richer, and ideally shared, understanding of information and agents in the community, and more particularly, to help the community close cognitive gaps or inadequacies in the community's current understanding of uncertain or ambiguous events, ideas, or situations.

Description of the Related Art

Media platforms on the Internet, including (but not limited) to news media and social media platforms, provide easy and efficient channels for the creation and distribution of information. However, a significant problem facing leading social media platforms (e.g., Twitter, Facebook, Reddit, etc.) is the abundance of "fake news" and misinformation. One of the few tools available to the managers of these platforms is to institute a form of filtering of content or other site moderation. Besides being labor-intensive, there is an issue of "Who chooses what is misinformation?" For example, an organization with more progressive values hosting a social media platform will hire editors and moderators with progressive values, and the filtering or other moderation at this social media platform will follow this preference, resulting in an "echo chamber" of progressive values. Unfortunately, this often produces polarizing views when the platforms are visited by members of the general public. Social media platforms aligned with conservative values similarly experience inherent bias issues. Governments worldwide have floated ideas on the potential of setting up special committees so that citizens of that country could have their news "filtered." But the parallels of this thinking to "Pravda" and the former Soviet Union are concerning.

BRIEF SUMMARY

The present disclosure provides a solution to inherent bias issues (whether it be progressive, conservative, authoritarian, libertarian, etc.) by providing a platform in which digital content, in the form of knowledge objects, is essentially "peer reviewed" by everyday members of the platform community, with a higher weight in voice/thought-leadership being given to those who have a history of quality input to the platform, with a focus of removing bias/misdirection and instead providing a path for community members to achieve a richer understanding. Secondly, the issue of labor-intensive centralized moderation is also addressed as the present disclosure provides platforms that are generally self-correcting. As a whole, members of the community acting with observable and attributable "good intentions" tend to filter out misinformation with their inputs to the platform, and therefore, the requirements for outside intervention (i.e., moderators) is negligible. For the most part, the community members collectively assume the role of moderators.

Implementations of the present disclosure help address the "cognitive gap" that occurs as a result of inadequate understanding of uncertain or ambiguous events, ideas, or situations. As will be appreciated from the present disclosure, this "cognitive gap" is best filled with a collaborative process that creates a shared awareness and community understanding out of different persons individual perspectives and varied interests. By seeking consensus evaluations of information and agents, implementations of the present disclosure help a community to create more robust and realistic representations of the surrounding world and induce community members to take actions, either to reduce a negative state or to enhance a positive state.

As will be described herein, in at least one implementation, a programmed computer is configured to receiving submissions from a plurality of community members with regard to a knowledge object. Each community member has a reputation value that is attributed to the community member, and each community member's submission regarding the knowledge object includes an evaluation value representing an evaluation of the knowledge object by the community member. The programmed computer is configured to determine a consensus evaluation of the knowledge object based on a calculated combination of the evaluation values in the submissions received and the reputation values of the respective community members who submitted the submissions.

While the programmed computer is receiving submissions from community members regarding the knowledge object, the programmed computer is configured to iteratively update the consensus evaluation of the knowledge object to produce an updated consensus evaluation. The updated consensus evaluation is calculated based on submissions received from community members up to each iteration including submissions received since a previous updating of the consensus evaluation. The updated consensus evaluation is a calculated combination of the evaluation values in the submissions received and the reputation values of the respective community members who submitted the submissions. Additionally, the programmed computer is configured to iteratively update the reputation value for each community member who submitted the submissions to produce an updated reputation value. The updated reputation value for each community member is calculated based on a determined contribution of the respective community member's submission to the updated consensus evaluation.

In accordance with principles of the disclosure herein, the programmed computer is configured to enhance the reputation value of a community member to a degree that the evaluation value submitted by the community member causes the updated consensus evaluation to become closer to a final consensus evaluation of the knowledge object. Similarly, the programmed computer is configured to diminish the reputation value of a community member to a degree that the evaluation value submitted by the community member causes the updated consensus evaluation to be farther from the final consensus evaluation of the knowledge object.

BRIEF DESCRIPTION OF THE SEVERAL VIEWS OF THE DRAWINGS

FIG. 5 illustrates digital content in the form of written text that directly displays a credibility rating of links in the text to specific knowledge objects on the platform.

FIG. 13B depicts the example one-dimensional scale of FIG. 13A in which the community member evaluates the intent of the author as inappropriate and provides underlying reasons for the negative evaluation.

FIGS. 14A-14E illustrate a spreadsheet that is operable by a programmed computer according to at least one implementation of the present disclosure, to receive submissions from community members, each community member having a reputation value and each community member including in their submission an evaluation value with regard to a knowledge object and a confidence value relative to their submission, with underlying calculation and iterative updating of a consensus evaluation of the knowledge object and iterative updating of the respective community member's reputation value based on an updated final consensus evaluation of the knowledge object.

FIG. 15 illustrates another spreadsheet that is operable by a programmed computer according to at least one implementation of the present disclosure, to receive submissions from community members, each community member having a reputation value and each community member including in their submission a two-dimensional evaluation value (e.g., with components representing competence and warmth of content) with regard to a knowledge object and a confidence value relative to their submission, with underlying calculation and iterative updating of a consensus evaluation of the knowledge object and iterative updating of the respective community member's reputation value based on an updated final two-dimensional consensus evaluation of the knowledge object.

FIG. 16 illustrates yet another spreadsheet that is operable by a programmed computer according to at least one implementation of the present disclosure, to receive submissions from community members, each community member having a reputation value and each community member including in their submission a multidimensional evaluation value (e.g., with components representing competence and warmth of content, and further representing an intent of the author) with regard to a knowledge object and a confidence value relative to their submission, with underlying calculation and iterative updating of a consensus evaluation of the knowledge object and iterative updating of the respective community member's reputation value based on an updated final multidimensional consensus evaluation of the knowledge object.

FIG. 17 illustrates still another spreadsheet that is operable by a programmed computer according to at least one implementation of the present disclosure, to receive submissions from community members, each community member having a reputation value and each community member including in their submission a multidimensional evaluation value (e.g., with components representing the level of support/opposition between two knowledge objects, and a Boolean value further representing the cause-effect direction between the two knowledge objects and more specifically, whether this cause-effect direction should be reversed to more accurately represent reality), with underlying calculation and iterative updating of a consensus evaluation of the knowledge object and iterative updating of the respective community member's reputation value based on an updated final multidimensional consensus evaluation of the knowledge object.

DETAILED DESCRIPTION

Figure 1:
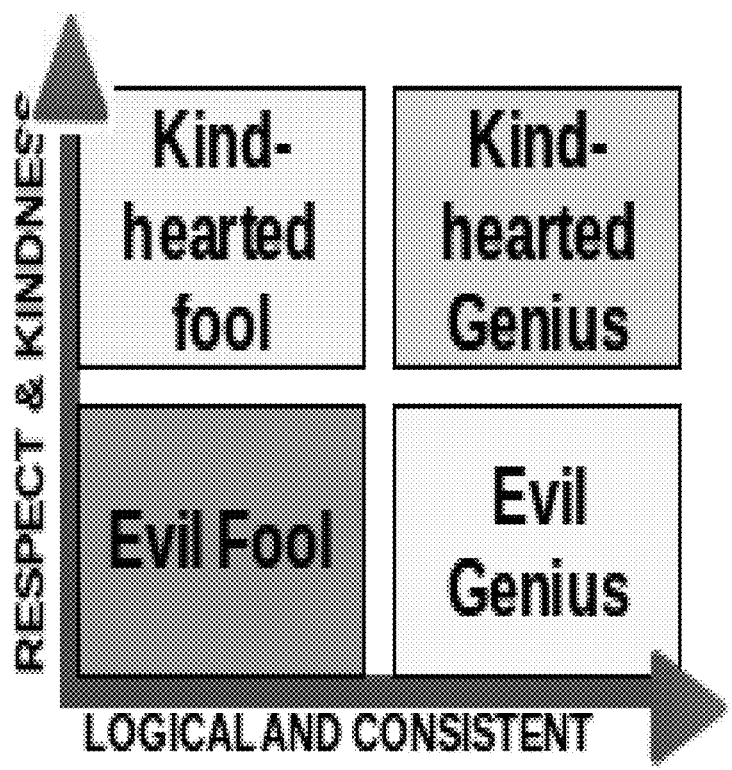
FIG. 1 illustrates an example of a two-dimensional matrix that a community member can use to evaluate a knowledge object in accordance with aspects of the present disclosure.

The present disclosure recognizes the extraordinary potential of the "wisdom of crowds." Using computer-aided methods and systems, implementations of this disclosure unlock this potential to provide members of a community with improved understanding of all forms of digital content. At the web site Investopedia, the concept of the "wisdom of crowds" is described as "the idea that large groups of people are collectively smarter than individual experts when it comes to problem-solving, decision making, innovating and predicting. For crowds to be wise, they must be characterized by a diversity of opinion and each person's opinion should be independent of those around him or her." (See www.investopedia.com/terms/w/wisdom-crowds.asp). At the web site Wikipedia, the "wisdom of crowds" is further described: "The classic wisdom-of-the-crowds finding involves point estimation of a continuous quantity. At a 1906 country fair in Plymouth, 800 people participated in a contest to estimate the weight of a slaughtered and dressed ox. Statistician Francis Galton observed that the median guess, 1207 pounds, was accurate within 1% of the true weight of 1198 pounds. This has contributed to the insight in cognitive science that a crowd's individual judgments can be modeled as a probability distribution of responses with the median centered near the true value of the quantity to be estimated" (See en.wikipedia.org/wiki/Wisdom_of_the_crowd).

Implementations of the present disclosure provide a "big data" "marketplace for ideas," typically in the form of a platform that allows Internet-scale collaboration and debate amongst members of a community to help reveal "truth" (or any other desirable measure) and bring clarity to any subject. The intention of this disclosure is to help communities close "cognitive gaps" or inadequacies in their current understandings of uncertain or ambiguous events, ideas, or situations. This "cognitive gap" is best filled with a collaborative process that creates shared awareness and a common understanding from varied perspectives.

Submissions of content and evaluations thereof by community members help communities achieve comparable "wisdom of crowds" benefits when dealing with everyday issues, specific goals like business development groups seeking out innovation potential and attempting to identify high potential targets, and other uncertainties and ambiguities, even civilization's greatest challenges. Implementations of the present disclosure are expected to improve group collaboration and group decision making.

Reputation values of individual community members and credibility evaluations of knowledge objects provide a measure of confidence in what the community collectively determines to be real or "true" (or an illusion or "false") or some other measure of importance to the community. In contrast to current social media platforms that use trivial likes/dislikes or up-votes/down-votes, implementations of the present disclosure equip community members to be far more expressive and collaborative in their efforts to achieve a shared understanding of truth or any other measure. With implementations of the present disclosure, collaboration and interactions between community members tend to mirror effective real-life working groups in which the best of a group's collective thoughts "bubble up" to the top as shared realizations.

In social systems, reputation matters. Likewise, with implementations of the present disclosure, community members that champion ideas or information that the community determines to be "true" are celebrated, and submissions by community members that exhibit disruptive behaviors, ignorance, and/or deception are filtered out. In other words, implementations of the present disclosure take into account past behaviors and performance of community members in ways that impact their influence in future discussions.

In ways, implementations of the present disclosure may be considered as adapting aspects of current Internet platforms in new and innovative ways to improve shared understanding of information by members of a community. For instance, aspects of the present disclosure may be compared to Wikipedia, the citizen-authored encyclopedia, which has leveraged collective intelligence of contributors and arguably become an influential source of information, or at least a reasonable source for non-divisive issues. See en.wikipedia.org/wiki/Wikipedia:Why_Wikipedia_is_not_so_great, en.wikipedia.org/wiki/Criticism_of_Wikipedia, and a letter from Wikipedia's co-founder larrysanger.org/2020/05/wikipedia-is-badly-biased/. Other aspects of the present disclosure may be compared to social news aggregators, such as Reddit and Twitter. Yet other aspects of the present disclosure may be compared to LinkedIn, which is the world's professional social network. Linkedin users are extremely careful about their online profile and their interactions with others, as their activity on the platform may impact important aspects of their real-world life (e.g., their profession). Still other aspects may be compared to Amazon community product reviews.

Implementations of the present disclosure can encourage appropriate group behavior, namely "good-heartedness," humility, and collective purpose, by members of the community. Implementations are also constructed so as to introduce methodologies that help community members to structure content submissions and their individual evaluations thereof with effective arguments, that may include supporting and/or opposing evidence, cause and effect relationships, levels of similarity between discussion threads, and additional relationships between individuals/organizations (agents). For purposes of the present disclosure, agents represent individuals or groups who may be in positions of influence. For example, agents may be journalists, media firms, media personalities, corporations, actors, politicians, political parties, community members participating in an implementation of the present disclosure, etc.

Aspects of the present disclosure may be viewed from the perspective of on-line news aggregation, as this is one of the applications where the present disclosure provides significant improvements over the current systems. Indeed, current online news aggregation sites (for example, Reddit) generally allow users to submit digital content and comments to digital content. However, the present disclosure is not limited to on-line news aggregation.

At Reddit, the community of users can view and vote-up/vote-down submitted content, discuss content via comment threads, etc. A typical goal for many Reddit content submitters is for their submitted content to reach the "front page," and thereby attract greater attention of the Reddit community. Reddit users benefit from using this site as the most popular content becomes more visible to them as opposed to submissions from others whose submitted content have been previously down-voted by the Reddit community. Unfortunately, this process often creates a popularity contest and is known to destroy diversity of opinion, effectively creating an "echo chamber" that insulates users from differing viewpoints.

To the contrary, implementations of the present disclosure seek to determine a level of confidence that should be attributed to a specific digital content (or knowledge object as referred to herein), based on a combination of data points, including (but not limited to) individual community members' reputation values, their evaluation of specific knowledge objects, and the contribution of their evaluation to an overall community consensus as to what is most likely an accurate representation of reality.

The present disclosure contemplates methods and systems for distributed cognition of digital content comprised of knowledge objects. Suitable systems typically include one or more computing devices having a processor in communication with computer memory. The processor is configured to perform actions in accordance with non-transitory executable instructions that are programmed and stored in the computer memory, and executed by the processor.

In a distributed computing environment, a central device, such as a server, is configured to communicate with one or more client devices via one or more communication channels (wired or wireless) in a local and/or global computer network (e.g., the Internet). In various implementations, the server operates to provide a platform as described herein, that is capable of communicating with the client devices. The client devices are generally operated by the community members referenced herein, and provide a means for the community members to review knowledge objects (which may be stored in the computer memory of the server or elsewhere on the network) and evaluate the knowledge objects. Accordingly, the server is configured to receive submissions from the community members (via the client devices), wherein the submissions each include an evaluation value representing an evaluation of the knowledge object by the submitting community member. The server further maintains a reputation value for each community member (e.g., in a profile stored in the computer memory).

The server is configured by one or more algorithms that carry out mathematical operations to determine a consensus evaluation of the knowledge object at issue. As described herein, the consensus evaluation is determined based on a calculated combination of the evaluation values in the submissions received from the community members and the reputation values of the respective community members who submitted the submissions.

While the server is receiving submissions from community members, the server is further configured to iteratively update the consensus evaluation of the knowledge object based on submissions received. The consensus evaluation is updated based on a calculated combination of the evaluation values in the submissions received, including newly received submissions, and the reputation values of the respective community members who submitted the submissions. Additionally, the server is configured to iteratively update the reputation value for each community member who submitted the submissions based on a determined contribution of the respective community member's submission to the updated consensus evaluation.

The contribution of each community member to the updated consensus evaluation is determined using one or more algorithms, carried out by the server, that implement mathematical operations to determine the amount that the community member's respective evaluation value caused the updated consensus evaluation to become closer to the final consensus evaluation of the knowledge object. The community member's reputation value is enhanced to the degree that their evaluation value influenced the consensus evaluation toward the final consensus evaluation. On the other hand, the one or more algorithms also implement mathematical operations that determine the amount that a community member's respective evaluation value caused the consensus evaluation to be farther from the final consensus evaluation. In this regard, the community member's reputation value is diminished to the degree that their evaluation value influenced the consensus evaluation away from the final consensus evaluation.

Implementations of the present disclosure thus provide platforms that incorporate some or all of the following aspects:

(1) A collection of stored digital content. Digital content (comprised of a knowledge objects as described herein) is any content that can be created, stored, manipulated, and retrieved by a programmed computer. Such content may include, but is not limited to, text, pictures, movies, audio, comments, profiles of individuals or groups, etc. Preferably, digital content (or knowledge objects) are in a form that can be argued (i.e., supported or opposed) by members of the community. For example, the statement "bananas are high in fiber" as a form of knowledge object is preferred over a submitted picture of a banana, given that the former can be argued.

(2) Multiple registered or otherwise distinguishable community members. Each registered community member is traceable and his or her history (i.e., reputation) on the platform is attributable, preferably back to a single person that is uniquely identifiable, e.g., by an account such as a Google account, email address, etc. By requiring distinguishable community members, implementations of the present disclosure can award higher credibility to submissions from a community member with a history of consistent logic and respect as opposed to submissions from community members exhibiting a history of disruptive behaviors, ignorance, and/or deception.

For example, consider a registered community member who has attained a very high reputation value (i.e., the community member is considered to be a "thought leader" on the platform). The community member may be allowed to publicize his or her reputation value on the platform and promote their profile with a link, similar to how individuals currently promote their public profiles with links to their user name at Twitter, Instagram, Facebook, LinkedIn, etc. Of course, in the privacy settings of implementations of the disclosure, a community member has control over what (how little or how much) the general public can see about their personal profile. Strategically, if a community member has a particularly strong reputation value in their profile, he or she will likely promote the reputation value to gain benefits (such as employment opportunities) in other aspects of their life. Therefore, an implementation of this disclosure, with its inherent focus on "reputation" and "peer review," has the potential to compete with and outperform existing professional networking platforms.

When considering community member reputation, implementations of the present disclosure recognize that "thought leadership" is not simply a function of "following the herd." For a community member seeking to attain a high reputation value on the platform, he or she cannot simply follow the current community consensus when evaluating a knowledge object. As much as reasonably possible, an embodiment of this disclosure seeks to ensure that community members are not influenced by others prior to providing an assessment or evaluation of a specific knowledge object. It is recognized that displaying a current community consensus for a specific knowledge object to community members who have not yet independently evaluated the knowledge object may bias those community members who have not yet submitted an evaluation, and such early disclosure of a consensus evaluation is contrary to the independent constraint preferred by the "wisdom of crowds."

To mitigate this, implementations of the present disclosure may be constructed such that a community member is not rewarded significant reputation points if he or she, in their evaluation, simply agrees with the current community assessment. A community member is rewarded significantly greater reputation value if he or she submits an evaluation of a knowledge object that is different than the current community consensus AND the community consensus subsequently drifts in the direction of the community member's evaluation. Similarly, if a community member submits an evaluation of a knowledge object and the overall community consensus subsequently drifts in a direction opposite to the community member's evaluation, the community member's reputation is likely to be negatively impacted. In some cases, the community member's reputation will be much more negatively impacted if it is determined from community submissions to the platform that a community member may have attempted to purposely mislead the community. The above mechanisms and the positive/negative effects to a community member's reputation create an appropriate feedback that encourages behaviors by community members that help the community achieve an accurate group assessment of the truth, or any other measure related to the knowledge object at hand.

(3) Implementations that enable registered community members to submit digital content that other community members can discuss and evaluate. Such digital content (knowledge object) may be comprised of original content and/or a link or reference to content that already exists (e.g., a web link to pre-existing content or a comment thereon, etc.). Registered community members can create and submit new knowledge objects to a platform of the present disclosure in a text form and/or they may upload pictures, movies, sound-clips, etc. Recognizing the fragmented nature of knowledge, in the course of receiving submissions from community members regarding knowledge objects, implementations of the disclosure may additionally help the community members focus the submission on a specific portion of the knowledge object, such as for example, a single line of text of interest from a news article instead of the entire article.

In some cases, implementations of the disclosure may use artificial intelligence (AI) algorithms to identify digital content of interest to community members and create knowledge objects on the platform for community members to review and evaluate. Such AI algorithms may observe community member interactions and, based on those interactions, build weighted values in the layers of the AI such that, when applied to body of content (e.g., news on the Internet), the AI algorithms identify items of likely interest to the community members. Community member interactions, in this regard, may also include profile preferences and/or evaluation history of individual community members.

(4) Implementations that provide community members with the ability to search knowledge objects on the platform and view a list of search results matching the search query. Using search features of this type, community members may identify and review knowledge objects of interest and add their evaluation of the knowledge object. Knowledge objects may also be suggested to community members based on the respective community member's profile (which may indicate, for example, an interest in computers, Middle East, science, etc.). The platform may customize feeds for a community member, showing knowledge objects existing in the platform, based on the community member's preferences.

(5) Implementations preferably help community members focus on a single knowledge object (i.e., a "central idea"). Community members reviewing the knowledge object will be provided relevant related context (e.g., related knowledge objects, comments, etc.) as may be available at the time, allowing them to focus on that specific knowledge object and aid them in making their best evaluation.

(6) Preferably, implementations provide a computer interface that helps community members personally interpret the central idea and thereafter submit their evaluation of the knowledge object via the computer interface. In specific cases, a registered community member may submit an interpretation of the central idea that is converted to a numerical value, according to one or more numerical interpretation scales. This numerical value forms the community member's evaluation of the knowledge object and is used in combination with evaluation values submitted by other community members, along with their respective reputation values. From all these elements together, a community consensus (a richer, shared understanding) of the knowledge object can be derived. Preferably, a community member can provide only a single evaluation of a knowledge object. Such single evaluation, however, may include multiple evaluation scales depending on the interpretations employed.

Only community members who are registered (i.e., attributable) can submit evaluations of knowledge objects. If anonymous users were permitted, the platform disclosed herein would struggle to detect underlying motives for the user, creating a risk that the community will be misdirected. In typical current systems, there are minimal negative consequences for individual or bots trying to spread misinformation, which helps explain the lack of quality one often encounters in the comment sections at many websites.

Various implementations of the disclosure allow registered community members to submit evaluations of knowledge objects based on one or more scales. Each scale can be considered to be an extra layer of human context that is stored in a database. Technically, there is no limit to the number of scales that community members can use to evaluate a knowledge object, but practically speaking, the number of scales cannot be infinite. Typical implementations of the present disclosure provide a friendly interface with minimal complexity to avoid overwhelming community members. In at least one preferred embodiment, a community member uses a 2×2 matrix (e.g., as illustrated in FIG. 1) to evaluate a knowledge object. The 2×2 matrix shown in FIG. 1 provides for evaluation of a knowledge object on a "Logical and Consistent" scale versus a "Respect and Kindness" (Good-heartedness) scale. A community member can evaluate what the knowledge object means to them by selecting a point anywhere on this 2×2 matrix. In this specific case, with a single input action, the platform will capture two input values according to the two scales provided by the matrix (one for an x-axis "Logical and Consistent" evaluation, and one for a y-axis "Respect and Kindness" evaluation).

In his book "Behave: The Biology of Humans at Our Best and Worst", Robert M. Sapolsky discusses in detail a similar 2-axes categorization model (with both axes being independent) when discussing "Us versus Them." One axis is "warmth," which is defined as "is the individual or group a friend or foe, benevolent or malevolent?" The second axis is "competence", which is defined as "how effectively can the individual or group carry out their intentions?" The defined "warmth" axis closely resembles the "Respect and Kindness" axis mentioned above, while the defined "competence" axis closely resembles the "Logical and Consistent" axis mentioned above.

Along with receiving a community member's evaluation as described above, a preferred implementation of the disclosure allows the community member to further submit a confidence value representing a level of his or her confidence in his or her submitted evaluation. In one example, a community member may select one of three confidence levels labeled "I know", "I think", and "I guess". The platform described herein can convert the community member's confidence level input into a numerical confidence value and use the confidence value to more accurately and credibly determine a community consensus evaluation of the knowledge object.

Preferably, registered community members can read and write comments (preferably threaded comments) as part of their evaluation of a specific knowledge object. Also, preferably, a community member can review evaluations left by other community members only if he or she has already submitted an evaluation for that specific knowledge object. Following established "wisdom of crowds" principles, individual community members should preferably remain independent of other community members prior to evaluating a knowledge object. Therefore, a community member viewing a specific knowledge object for the first time should have limited (or ideally, no) access to evaluation values or comments left by other community members prior to that first-time-community member providing his or her own independent evaluation of the knowledge object.

(7) An ability by community members to submit evidence (or a link to such evidence) that supports or opposes the central idea. When the evidence is another knowledge object that is already present on the platform, the community member's submission would be a link between the knowledge objects, e.g., a Link Knowledge Object (LKO). LKOs, like other knowledge objects discussed above, would preferably allow a community member to provide only a single evaluation per scale. Allowing knowledge objects to be linked by an LKO provides richer context and supports the notion that a broader understanding of an issue is gained by considering the inter-connection of ideas.

Figure 2A:
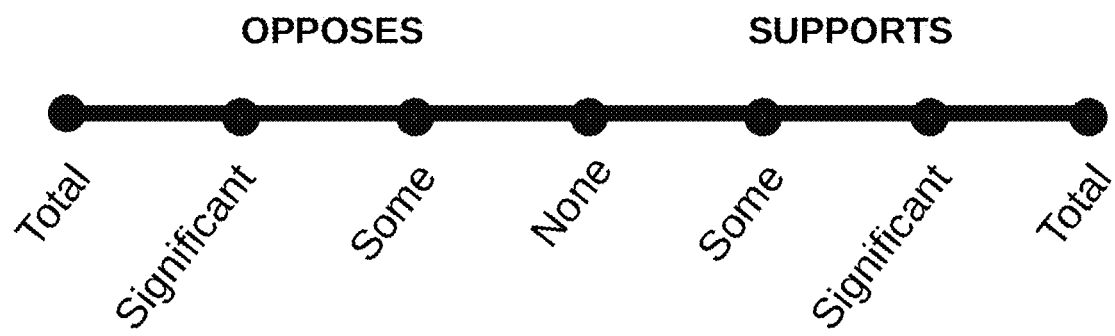
FIG. 2A depicts an example of a one-dimensional scale that a community member can use to evaluate a level of support or opposition of a knowledge object being linked to another, central knowledge object.
Figure 2B:
FIG. 2B depicts an example of a one-dimensional scale that a community member can use to evaluate a level of similarity or dissimilarity of a knowledge object being linked to another, central knowledge object.

In various implementations, LKOs may be evaluated according to one or more rating scales that rate the level of support or level of opposition for a knowledge object, for example, support (or opposition) ranging from "none" to "total" (see FIG. 2A), and which ratings are convertible to a numerical value. In various implementations, community members may link the central idea to other knowledge objects by way of a "similar to" evaluation on a scale ranging, for example, from "not alike" to "identical", and convertible to a numerical value. (See FIG. 2B.)

Figure 2C:
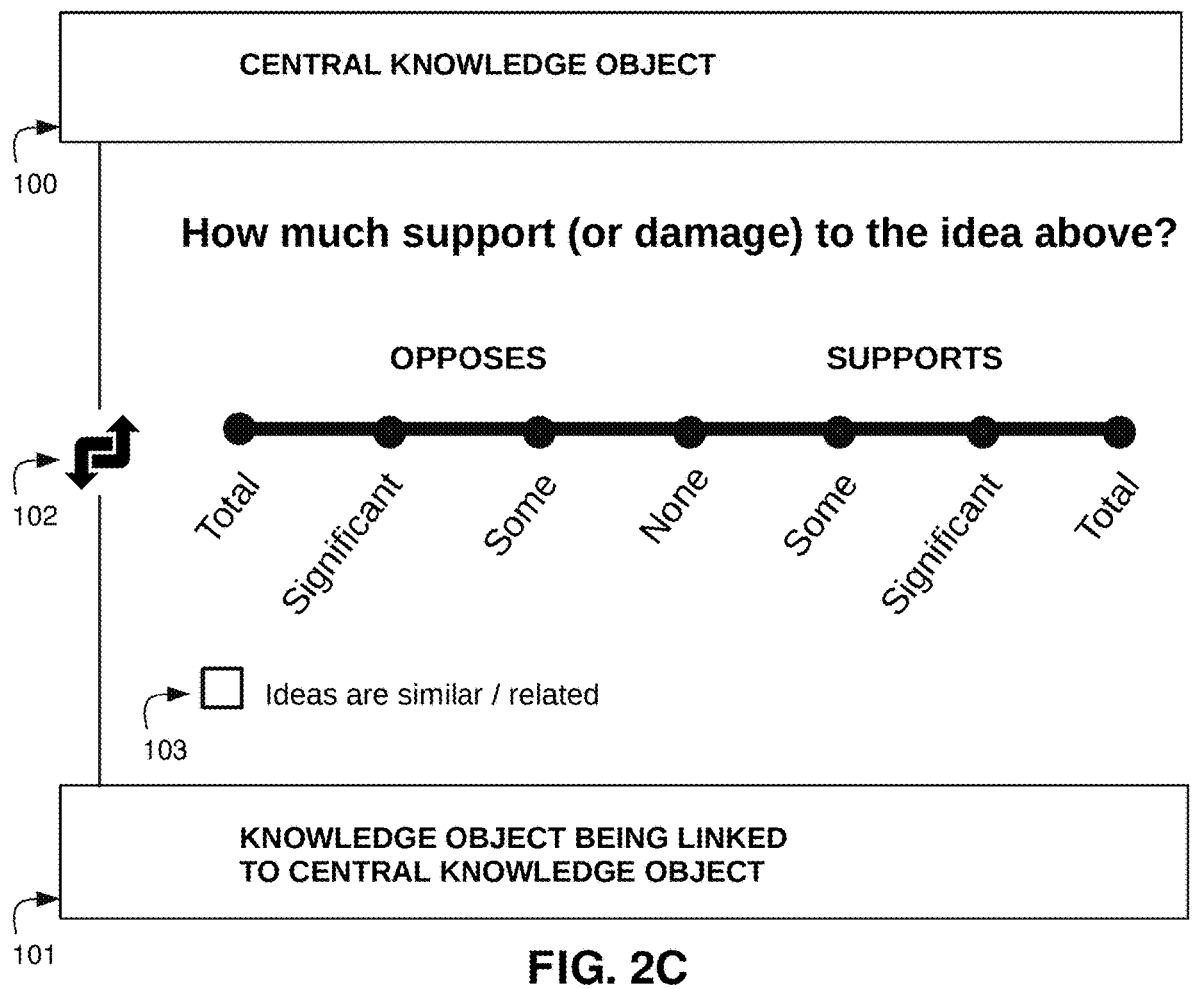
FIG. 2C depicts an example of a one-dimensional scale that a community member can use to evaluate a level of support or opposition of a knowledge object being linked to another, central knowledge object, while allowing the community member to reverse cause-effect direction between knowledge objects and/or allow the community member to instead show the relationship as a level of similarity or dissimilarity (e.g., as shown in FIG. 2B).

FIG. 2C shows how both of the above concepts can be merged together into a single interface, with an additional feature of allowing a community member to reverse the cause-effect relationship(s), as shown, between the knowledge objects 100, 101 by pressing the button 102. Also, by selecting the check box 103, a community member will be able to view the similarity scale shown in FIG. 2B.

Figure 3A:
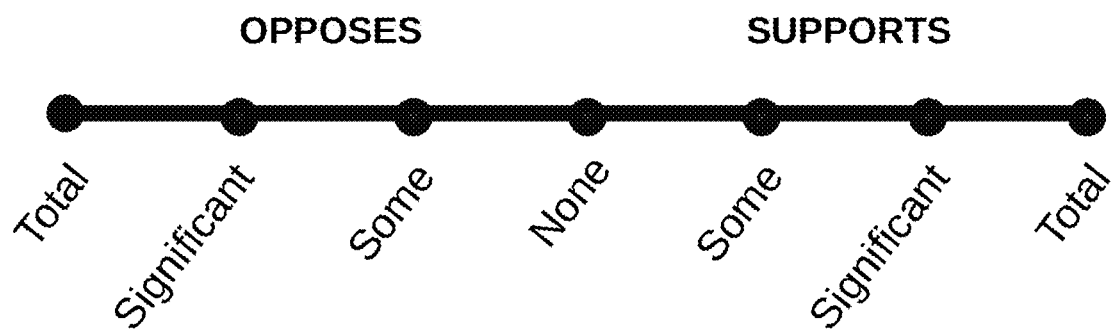
FIG. 3A depicts an example of a one-dimensional scale that a community member can use to evaluate a level of support or opposition of a knowledge object as it relates to an agent.
Figure 3B:
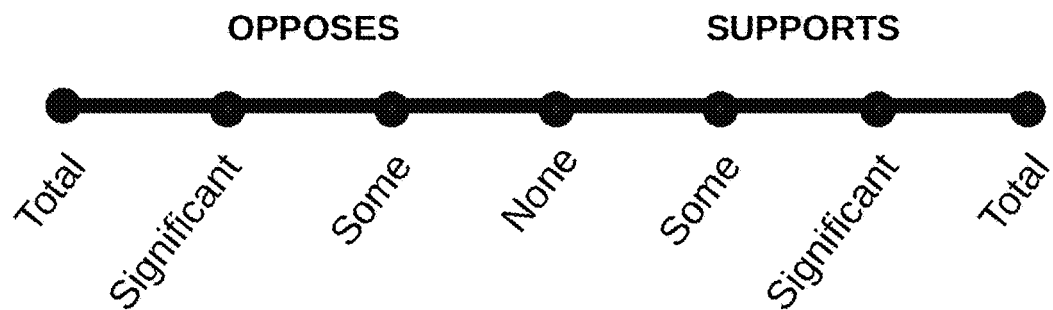
FIG. 3B depicts an example of a one-dimensional scale that a community member can use to evaluate a level of support or opposition between two agents, with the ability to change the scale to evaluate a level of similarity or dissimilarity.

For additional clarity, central knowledge objects can also be linked to agent knowledge objects to show a level of support (or opposition) between them, as shown in FIG. 3A. In addition, agent objects can linked to other agent objects as shown in FIG. 3B. In the latter case, agents can be linked to show a level of support (or opposition) between them, as shown. Alternatively, by selecting a checkbox 104, a similarity scale will be displayed (similar to what was shown in FIG. 2B when linking knowledge objects).

Preferably, registered community members can read and write comments (preferably threaded comments) as part of their evaluation of a specific LKO. Also, preferably, a community member can review LKO evaluations left by other community members only if he or she has already submitted an evaluation for that specific LKO. Following established "wisdom of crowds" principles, individual community members should preferably remain independent of other community members prior to evaluating an LKO. Therefore, similar to the knowledge object evaluations discussed above, a community member viewing a specific LKO for the first time should have limited (or ideally, no) access to evaluation values or comments left by other community members relative to the LKO prior to that first-time-community member providing his or her own independent evaluation of the LKO.

Figure 4:
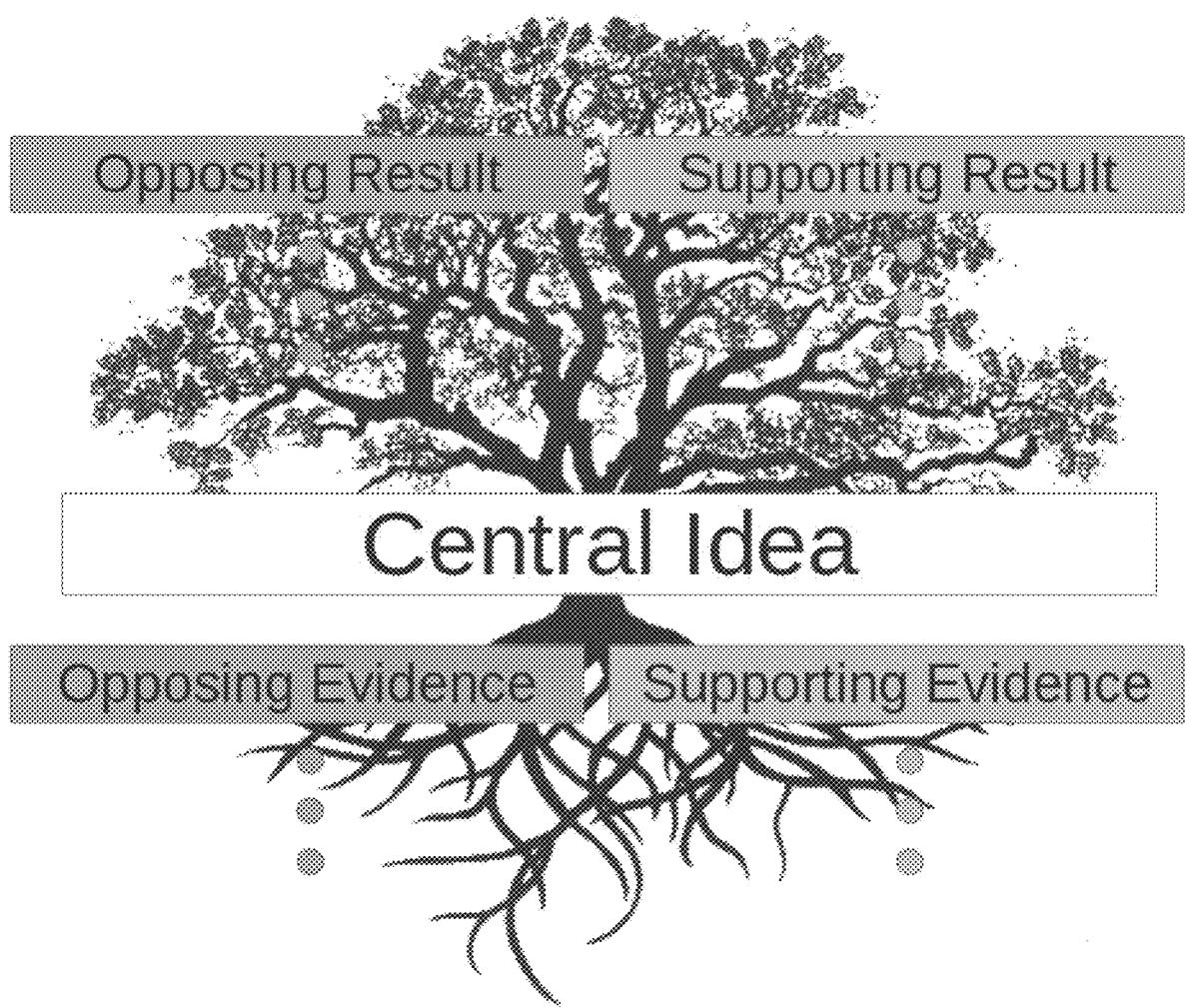
FIG. 4 illustrates a tree-like structure that pictorially represents a knowledge object that is supported or opposed by evidence of underlying causes, and/or gives rise to supporting or opposing effects or results.

In some implementations, the knowledge objects and LKOs may be visualized as a tree-like structure (see FIG. 4) in which a specific knowledge object can be considered the trunk of the tree (referring to this, for convenience, as the "central idea"). The roots of the "central idea" are knowledge objects that are viewed as the "underlying causes" or "pre-conditions" of the central idea. Each connection between the knowledge objects is an LKO. Furthermore, the roots may be further subdivided into two sub-categories, namely supporting evidence or knowledge objects that strengthen, enable, or couple the central idea, and opposing evidence or knowledge objects that damage, restrict, or limit the central idea. The branches of the tree-like structure are knowledge objects that are viewed as the "effects" or "results" of the central idea (or sometimes more accurately described as the consequences, the "so what?", the "bigger picture", etc.) Once again, the actual connections between these knowledge objects are LKOs. Furthermore, the branches may be subdivided into two sub-categories, namely knowledge objects are supported by or opposed by the central idea. From the perspective of the central idea, the knowledge objects in the branches more so represent supporting and opposing results/effects rather than causes.

Following the conventions of visually representing the structure of an argument using argument maps (en.wikipedia.org/wiki/Argument map), the cause-effect relationships extend upwards from roots to branches.

If one navigates down the tree one level (e.g., selecting a root knowledge object will regenerate the graphic and migrate one's primary attention from the central idea to a supporting evidence root), the original supporting evidence root may now be viewed as a new central idea of the re-generated tree-like structure. In this re-generated view, the original central idea becomes a supportive branch of the new central idea. As should be clear, branches can extend infinitely upward and roots can extend infinitely downward as knowledge objects can have any number of linked "roots" and "branches."

(8) Using the collection of evaluated knowledge objects stored in a database, computer algorithms implemented by a programmed computer as described herein can synthesize the knowledge objects and their associated evaluations, and provide one or more ratings (for confidence/credibility, "better-world-ness", evil-geniusness, innovativeness, compatibility with a firm's capabilities, and the like) for any specific submitted digital content. Such algorithms weigh the credibility ratings of knowledge objects within the context of assessing supporting or opposing evidence (and preferably, "similar to" links as described above) along with the credibility of all inputs (i.e., community member evaluations and credibility inputs, etc.) provided by the community members.

To establish a reputation value (e.g., credibility rating) of a registered community member, algorithms of the platform described herein weigh combined historic value(s) of contributions from that community member. In parallel to real-life, if a community member develops a history of deceit, manipulation, disrespect, dishonesty, and/or foolishness, as assessed by other community members, the particular community member's reputation value will be lower than the reputation value of a community member who has a history of integrity, good-hardheartedness, honesty, and intelligence.

In various implementations, platforms constructed according to the present disclosure may store community members' individual profiles. These profiles may contain, for example, the reputation values of the community members. A community member can optionally provide additional profile information in terms of his or her level of expertise in various fields, for example, medical/health, physics, economics, biology, computers, languages, philosophy, psychology, education, engineering, astronomy, etc.

A preferred embodiment of this disclosure will further ask a community member to "self-rate" his or her level of expertise or other measure of ability to accurately evaluate the knowledge object at hand. For example, in a possible implementation, community members may first be asked to select which areas they believe their expertise exceeds the population average. For all those areas selected, community members may be then prompted to choose one of the following ratings that best describes their level of expertise: expert (top 1% of the population); professional (not expert, but top 10% of the population); skilled (not expert/professional, but top 25% of the population); better than average (not expert, professional, or skilled, but top 50% of the population); and a default setting for those who choose not to provide additional profile information, namely less than average (bottom 50% of the population). If a community member claims a particularly high level of expertise (i.e., expert, professional, etc.), he or she may need to provide a justification for that rating (i.e., a description of experience, education, etc.) that can then be peer-reviewed and accepted or rejected by other high-expertise members of the community.

A community member's profile in this regard is not necessarily limited to recording levels of expertise. Community members can also optionally provide self-ratings of other personal details and preferences (i.e., male/female, age, political leaning/preference, etc.). Also, a platform can utilize questionnaires to more indirectly measure values and the like.

(10) Derived knowledge or insights. Given the wealth of information stored in a platform according to the present disclosure (namely, digital content, community member ratings, community member credibility/reputations, levels of expertise/preferences, etc.), the platform has the ability to search out and identify significant relationships and make greater sense of the world around the community. The platform may share these discovered relationships with the community members as "derived insights." For example, derived insights could include "Controversial! Strong opinions are grouped in two clusters," "Women find this content more credible than men," "Individuals with medical training find this content significantly less credible than those without medical training," "A cluster of low reputation community members, known to the system for prior attempts to purposely mislead, has attempted to misdirect," or "Polarizing: those more aligned with the political left find this story highly credible while those more aligned with the political right find this story not credible." In a preferred embodiment, implementations of the disclosure may present most-significant derived insights alongside the title of the knowledge object.

Additional aspects to consider: In the age of the Internet, hyperlinks are commonly used to link web pages and documents together, and implementations of the present disclosure may determine a reliable "credibility rating" (and the like) for any knowledge object entered into the platform. Therefore, these two features may be combined and implemented so that when a community member is reading a document (for example, Word document or web page) that includes hyperlinks to specific knowledge objects residing elsewhere on the platform, the "credibility rating" of the link to the knowledge object could be directly displayed in the document or web page, without a reader needing to click on the hyperlink. See, e.g., FIG. 5. With this enhancement, the credibility rating of a hyperlink may be displayed near the hyperlink, e.g., as a bubble or other type annotation, so that community members reviewing the document links will have an immediate clarity and confidence in the quality of the hyperlinks shown.

Implementations of the disclosure generally seek to not overwhelm or intimidate community members from participating on the platform. In particular, aspects of the platform play a critical role in providing a structured framework for community members to link knowledge objects to other knowledge objects, without which, complex issues may fast become overwhelming. From a usability perspective, the platform interface preferably provides a piecemeal approach to evaluating information, compatible with human preferences to focus on a single element or relationship at a time. Background processes of the platform perform the underlying math related to calculating community consensus evaluations for a knowledge object along with impacts of a community member's individual contribution to the community consensus, i.e., impacts on their respective reputation values. The platform also allows community members to self-discover knowledge and context by digging deeper into available information and exploring other possibilities, evidence, and links between knowledge objects themselves, with ultimate transparency.

An important concept that implementations of the present disclosure take into account is that of "Message" versus "Messenger Intent." As popularity tends to drive profitability, current social media and traditional news media organizations that are most capable of holding the public's attention have thrived. As opposed to high-quality traditional journalism (that consistently exhibits "good intentions"), an increasingly popular recipe for "success" is to grip one's audience with emotionally-charged sensationalism that blurs the lines between fact and opinion. In such an environment, it is not surprising to see increasing polarization and growing mistrust across society. The foundation of trust is truth and honesty, and the foundations of trust and honesty are "good intentions" and transparency of the community members participating in the community. Where discovery of "legitimate truth" is an end-goal of the community, "good intentions" of the community members are absolutely essential (and often absent in current public discourse) in the course of discovering such "truth." To capture the concept of good intentions, the present disclosure introduces an important construct that distinguishes a MESSAGE (i.e., the content of a knowledge object) from MESSENGER INTENT (i.e., the message author's intention in creating the content forming the knowledge object).

In various implementations of the present disclosure, knowledge objects may be composed of a MESSAGE and MESSENGER INTENT. Together, these two components are referred to as a KNOWLEDGE OBJECT.

By way of one example, consider a well-written, objective account of the Nazi holocaust. It is reasonable to expect good-hearted community members to interpret the account in a manner that provides high marks to the MESSENGER INTENT. On the other hand, the MESSAGE itself may be interpreted as deservedly dark or evil. Nevertheless, in such a case, the entire story (MESSENGER INTENT and MESSAGE) becomes a credible KNOWLEDGE OBJECT in the platform of the present disclosure.

In contrast, consider an important news article written in a clearly biased manner, injected with disrespect and emotionally-charged language vilifying "one side" of the subject matter being reported. It is reasonable to expect good-hearted community members who have read the article to interpret the piece in a manner that provides low evaluation of the MESSENGER INTENT. In such a case (and regardless of the MESSAGE), the entire story (MESSENGER INTENT and MESSAGE) becomes a low credibility KNOWLEDGE OBJECT in the platform of the present disclosure.

"Good intentions" matter and a lack of good intentions in various implementations may essentially disqualify a KNOWLEDGE OBJECT from further evaluation, which impacts its ability to add truth and credibility to any discussion. Building further upon this MESSENGER INTENT construct, implementations of the present disclosure intentionally attempt to increase a contributing community member's self-awareness when making a submission to the platform.

Figure 6A:
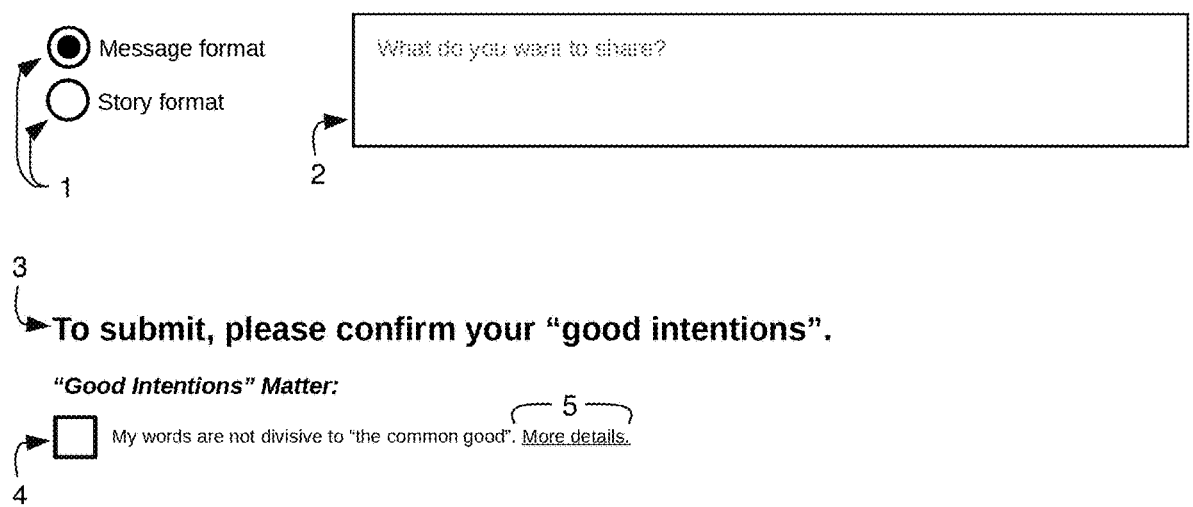
FIGS. 6A-6C depict input forms that a community member can use to submit a knowledge object to the platform, in a message format, and affirm his or her good intentions in making the submission.

In at least one preferred embodiment, the platform may deploy an input form (FIG. 6A) that can be used to support a registered community member wishing to submit his or her own MESSAGE and create a KNOWLEDGE OBJECT. In this example, assuming the registered community member wishes to input a simple MESSAGE (not unlike how Twitter is commonly used today), the platform provides a radio button input 1 labelled "Message format" that the community member may select, as opposed to "Story format." A text box 2 is provided, allowing the community member to input his or her MESSAGE. Before the community member is allowed to submit to the platform, he or she will be instructed 3 to confirm a minimum level of good intentions via a checkbox input 4. If the community member does not confirm a minimum level of good intentions, a submit button will not be displayed and the community member will not be able to submit the MESSAGE.

Figure 6B:
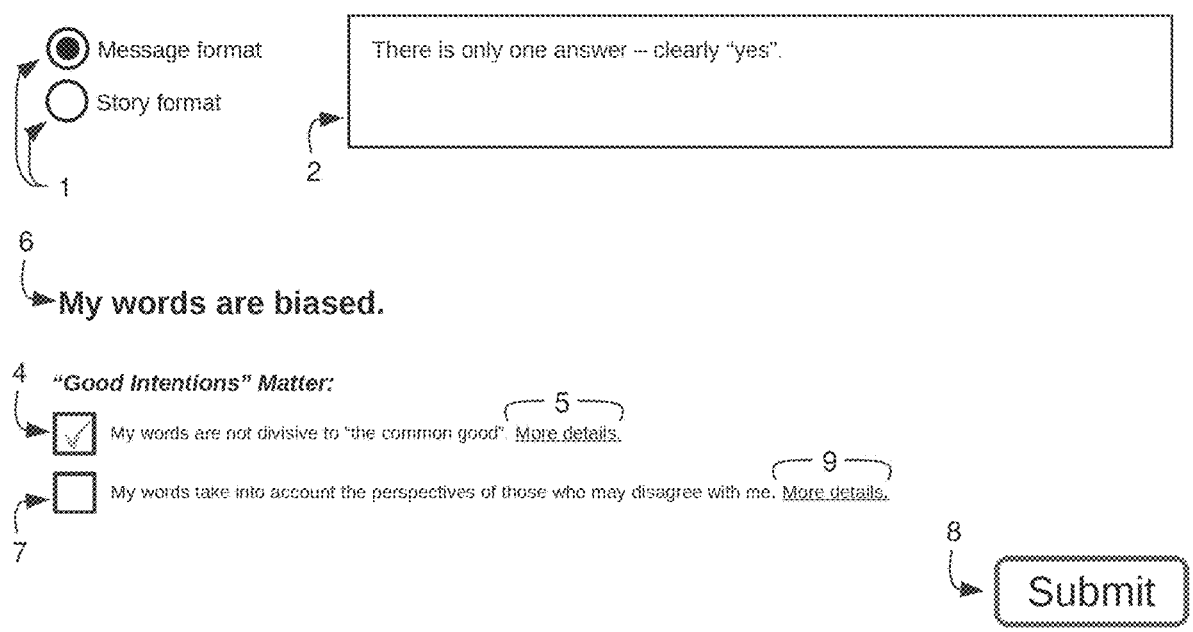

Once the community member enters his or her MESSAGE into the text box 2 and confirms "good intentions" via the checkbox input 4, as shown in FIG. 6B, the instruction/status 6 will be updated, and an optional higher level of "good intentions" checkbox input 7 may be offered. Also, a submit button 8 will be displayed, allowing the community member to submit the KNOWLEDGE OBJECT to the platform.

If the community member now presses the submit button 8, the KNOWLEDGE OBJECT is submitted with the MESSENGER INTENT self-rated with the lowest acceptable level of "good intentions." If the subsequent collective evaluations of the MESSENGER INTENT by the community does not meet a threshold level of "good intentions" (such as the lowest acceptable "good intentions"), the MESSAGE author's profile rating will be negatively impacted. Alternatively, if the community interprets the MESSENGER INTENT as meeting or exceeding the community member's self-declared level of "good intentions," the MESSAGE author's profile rating will be positively impacted.

Figure 6C:
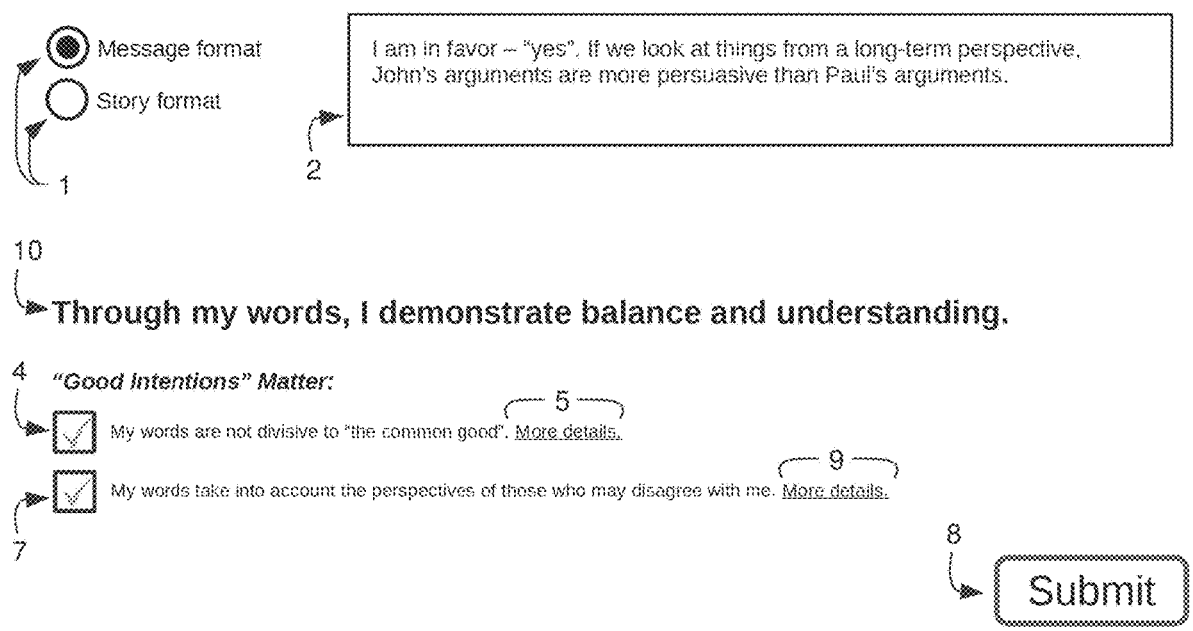

Now, consider an example where the community member does not press the submit button 8 but instead confirms a higher level of "good intentions" via the checkbox input 7 (see FIG. 6C). The instruction/status field will be updated 10, and a submit button 8 will remain displayed, allowing the KNOWLEDGE OBJECT to be submitted.

If the community member now presses the submit button 8, the KNOWLEDGE OBJECT is submitted with the MESSENGER INTENT self-rated with a higher level of "good intentions." The potential contribution impact to the community's conversation of this KNOWLEDGE OBJECT is now higher than when the KNOWLEDGE OBJECT was self-rated by the author with the lowest acceptable good intentions. Therefore, those community members wishing to have greater impact in the community (and gain greater credibility or prestige) will be encouraged to select a higher level of good intentions (checkbox input) 7. However, as discussed above, if the community evaluates the MESSENGER INTENT as not meeting the "good intentions" self-rated standard, the MESSAGE author's profile rating will be appropriately negatively impacted.

This self-correcting "tension" (between wishing to have as much impact in a conversation but not wishing to damage personal credibility or reputation value by over-stating one's "good intentions" rating) will encourage some community members to re-edit their MESSAGE in the text box 2 so as to sincerely allow them to select a higher level of "good intentions" thereby maximizing their impact of their contributions in the community. All of these factors working together are purposefully intended to raise the quality of discourse in this invention.

An absolute minimum level of good intentions 4 is intended to ensure basic civil discourse. The "More details" link 5 may provide the following guidance (or the like):

I am not being divisive to the "common good." I am not:
Promoting hate, violence, or suffering;
Being purposefully deceptive or manipulative;
Assigning a judgment label with an intent to reduce an adversary to something less than they actually are (labelling/bucketing/de-humanizing);
Attempting to demonstrate my "cleverness" or "superiority" at the expense of others;
Expressing opinions (at the expense of others) intended to demonstrate my good character or the moral correctness of my position (righteousness/virtue signalling);
Attacking a person's character rather than the issue ("ad hominem" attack); or
Taking another person's argument or point, and distorting it or exaggerating it in an extreme way. Then, attacking the extreme distortion as if "that" really was the claim the other person is making ("straw man" argument).

The optional higher level of "good intentions" (checkbox input) 7 is intended to help community members become more aware of (and avoid) biased thinking. The "More details" link 9 could provide the following guidance (or the like):

Through my words, I demonstrate balance and understanding. I am not:
Mystified by "the other side";
Displaying over-confident "all-or-nothing" or one-sided thinking, or an inability or not wanting to embrace ambiguity;
Failing to consider alternative explanations;
Filtering: Only paying attention to certain information compatible with my story and disqualifying/ignoring "inconvenient truths" not compatible with my story;

Over-generalizing: One event may not be representative of normal reality; or

Showing arrogance, lack of humility, close-mindedness, knowing-it-all, exaggeration, "wishful thinking," or telling others "what they should believe".

Figure 7A:
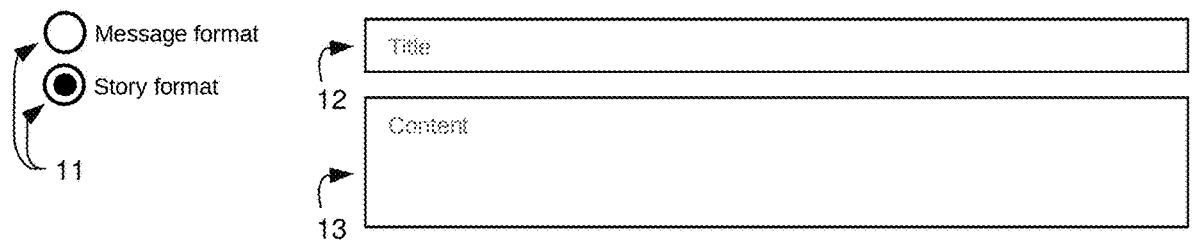
FIGS. 7A and 7B depict input forms a community member can use to submit a knowledge object to the platform, in a story format, and affirm his or her good intentions in making the submission.

Assuming a community member wishes to input a longer MESSAGE (similar to traditional news stories or how Reddit is commonly used), FIG. 7A shows the radio button input "Story format" 11 selected, as opposed to "Message format." A text box for the title 12 and a text box for the content 13 will then be provided. A community member's self-rating of good intentions for the "Story format" submissions follows methodology described above for "Message format" MESSAGES.

Figure 7B:
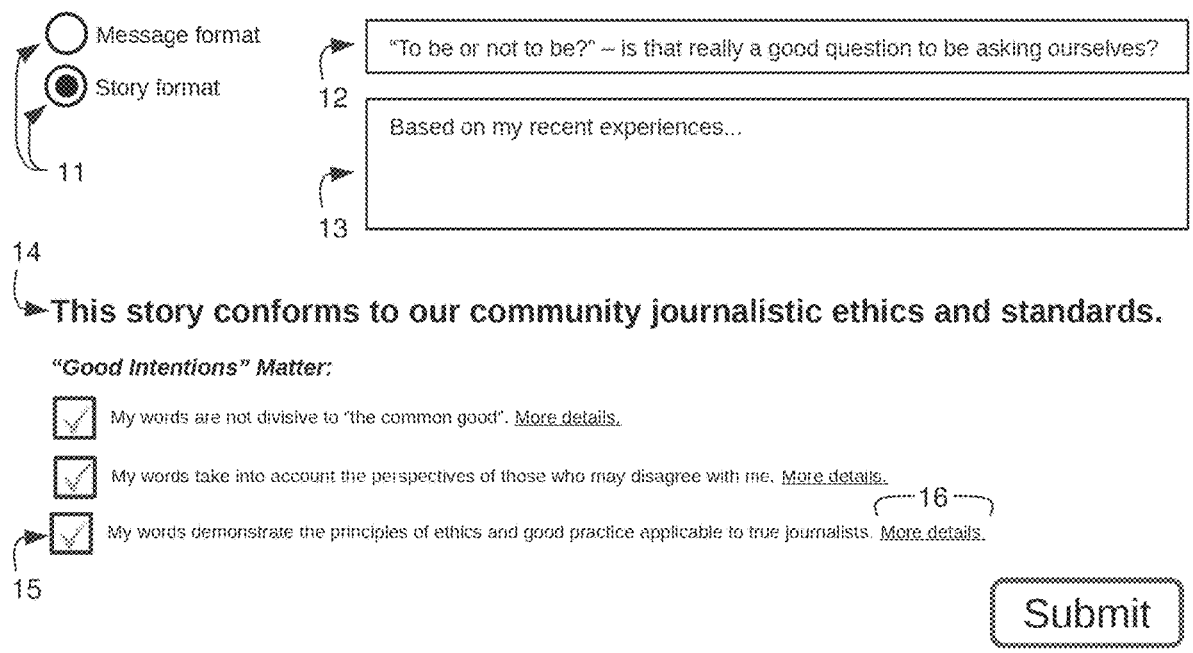

In at least one preferred embodiment, only "Story format" MESSAGES can be considered "true journalism." FIG. 7B illustrates this highest level of good intentions as being an option (checkbox input 15) that is offered, and if the option (checkbox input 15) is selected, the instruction/status will be updated 14. The optional highest level of "good intentions" (checkbox input 15) is intended to encourage community members to appreciate and/or honor the highest level of journalist standards and ethics, and to inspire community members to seek to write to such standards. The "More details" link 16 could link to "The 7 Canons of Journalism" (known in the art), or the like.

Figure 8:
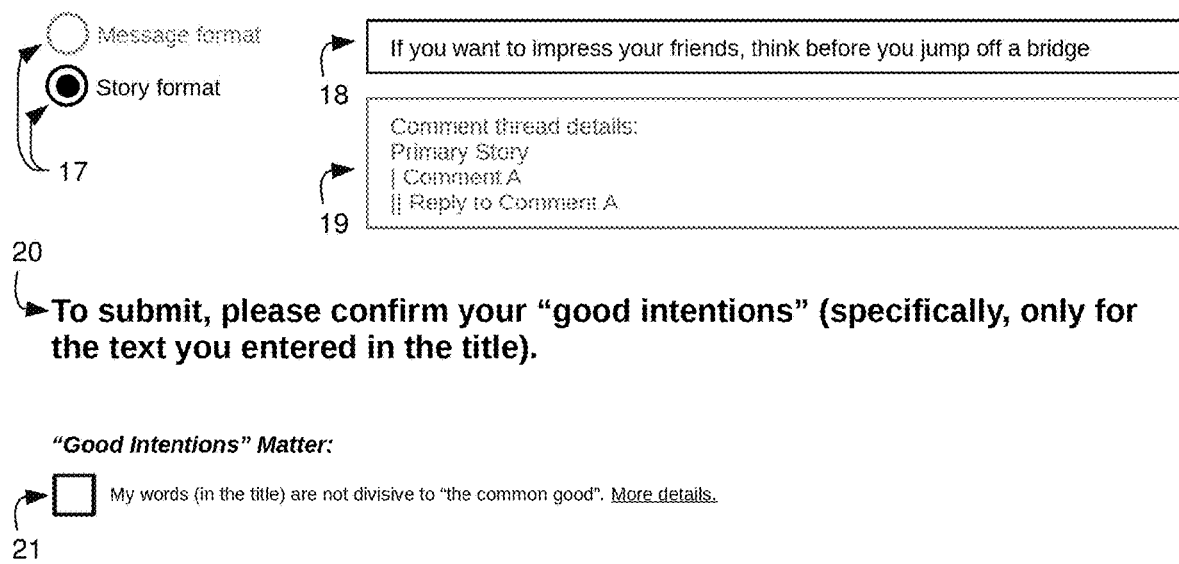
FIG. 8 depicts an input form that a community member can use to submit an existing comment on the platform, to elevate said comment to become a knowledge object itself, in a story format, and affirm his or her good intentions in making the submission.

Occasionally, an online comment at an online newspaper or at Reddit (i.e., deep in a news article's online discussion thread) may be particularly noteworthy (and may even be more "newsworthy" than the news article itself). An embodiment of this disclosure allows a registered community member to elevate any comment to the same level as a KNOWLEDGE OBJECT. FIG. 8 illustrates an updated input form for this specific case. In such a case, the radio button input "Story format" is shown selected and "Message format" is greyed out (i.e., inaccessible) 17. The registered community member is required to input a title 18 (which is typically a short commentary or opinion of why the comment is being elevated). The content 19 is auto-generated and references the comment thread being elevated. The self-rating of good intentions 20, 21 is specific to the title (as this is the only original prose being submitted and relates to the registered community member making the submission), and follows the methodologies discussed above. Upon submission, the submitting community member will then preferably be asked to provide his or her interpretation of the MESSAGE 19 using a scale as shown in FIG. 1.

The input form (FIG. 9) can be used to submit existing digital content (i.e., an article on the Internet at a specific URL, an online newspaper article, etc.). In such a case, the radio button input "Story format" is shown selected and "Message format" is greyed out or inaccessible 22. The registered community member is expected to supply the URL 24 and ideally, the preferred embodiment of this invention will auto-fill the title of the article 23, the name of article's author 25, and his or her affiliation 26, if one exists (i.e., BBC, CNN). The registered community member has the ability to correct or override auto-filled content 23, 25, 26 as necessary. As such, a submission does not generally involve text input or prose from the community member, there is no need for the community member to self-rate his or her good intentions. Once this KNOWLEDGE OBJECT is submitted, the MESSAGE relates to the content of the article 23 and the MESSENGER INTENT relates to the intent of the author or affiliation 25, 26. Upon submission of the KNOWLEDGE OBJECT, the submitting community member is then preferably asked to provide their interpretation of the MESSENGER INTENT (FIG. 13A), and if the MESSENGER INTENT rating exceeds a minimum threshold, the submitting community member is requested to evaluate the MESSAGE (FIG. 1).

Figure 10:
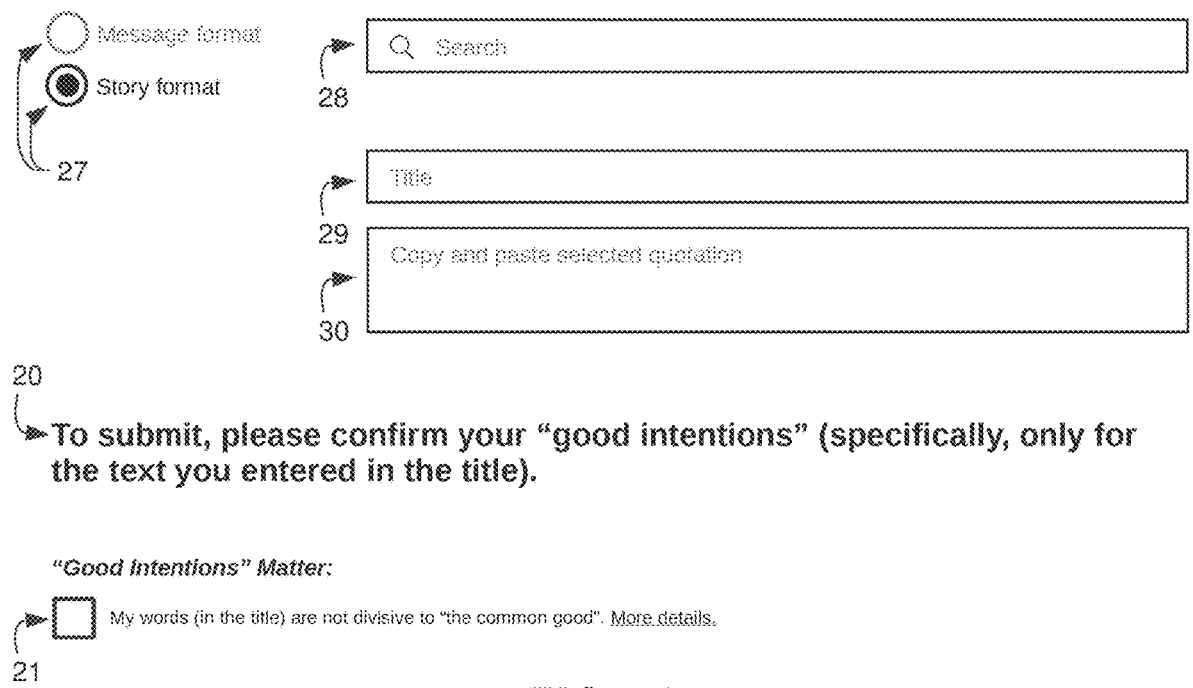
FIG. 10 depicts an input form that a community member can use to submit a quotation from an existing knowledge object on the platform, in a story format, and affirm his or her good intentions in making the submission.

In yet another embodiment, a specific quote can be submitted (FIG. 10) from a previously submitted KNOWLEDGE OBJECT. In such a case, the radio button input "Story format" is shown selected and "Message format" greyed out or inaccessible 27. The registered community member is able to search for, and select, a previously submitted KNOWLEDGE OBJECT that he or she wishes to reference (from which the quotation comes) using a search box drop-down menu that is commonly used in the art 28. The community member is then required to input a title 29 (the title is typically a short commentary/opinion of why the specific quote was selected).

The actual text/quote 30 being highlighted in this submission is a direct quote taken from the MESSAGE of the previously-submitted KNOWLEDGE OBJECT. A self-rating of good intentions 20, 21 is specific to the title (as this is the only original prose/opinion being submitted by the community member) and follows methodologies discussed above. Upon submission, the submitting community member will then preferably be asked to provide his or her interpretation of the MESSAGE 30 using a scale as shown in FIG. 1. This example shows how specific details of an existing MESSAGE can be dissected (at a more granular level) which better supports the fragmented nature of knowledge.

Figure 11:
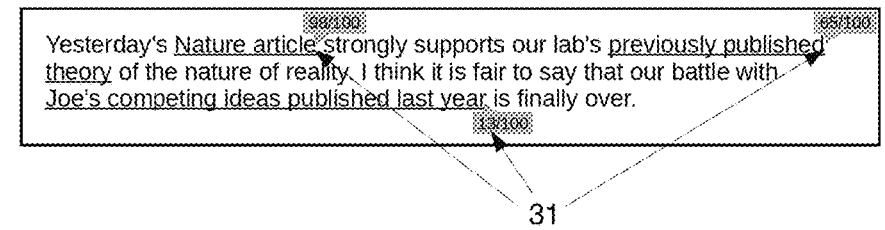
FIG. 11 depicts an input form that a community member can use to submit a knowledge object to the platform, in a message format, that incorporates references to three previously submitted knowledge objects and their respective credibility ratings.

FIG. 11 shows a submission that a registered community member can make that incorporates references to three previously submitted KNOWLEDGE OBJECTS and their respective credibility ratings or "attributes" 31. In this case, a community member references previously submitted KNOWLEDGE OBJECTS in his or her prose and selects the KNOWLEDGE OBJECT attributes to display, in this case "credibility" (which are then automatically updated by the embodiment whenever the prose is displayed).

Figure 12:
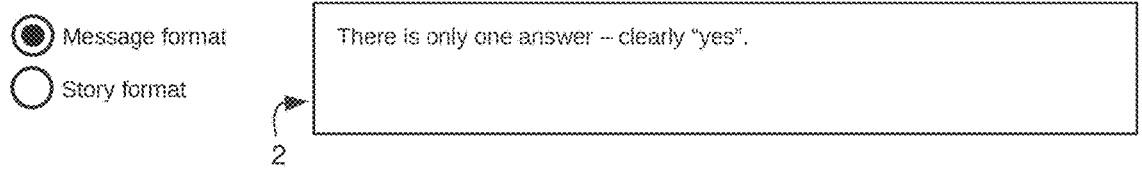
FIG. 12 depicts an input form that a community member can use to submit a knowledge object to the platform, in a message format, and affirm his or her good intentions in making the submission while providing additional self-reflection by submitting arguments against and/or common ground for the knowledge object.

Another embodiment is shown in FIG. 12 where the input form provides an additional opportunity for further self-reflection by the community member prior to his or her submission with additional requests for arguments against 32 and/or common ground 33 with or for the knowledge object.

When "arguments against" 32 and/or "common ground" 33 are used in an embodiment of this disclosure, the community members (i.e., other community members) will interpret the MESSENGER INTENT by considering all self-rating levels selected by the submitting community member 4, MESSAGE content 2, and other self-reflective descriptive text provided 32, 33.

To conclude discussions regarding the input form, the preferred embodiment also supports a "waiting zone" feature in which the KNOWLEDGE OBJECT is not immediately submitted, but can be configured to a community member's preference. For example, a KNOWLEDGE OBJECT will be sent in "x" hours/minutes if not edited or deleted by the community member before then; or a KNOWLEDGE OBJECT will be held in "draft" for "x" hours/minutes, and once the timer expires, the knowledge object (digital content) must be re-confirmed by the community member before submission. Alternatively, the KNOWLEDGE OBJECT must be reviewed and approved by selected chosen editor(s) before submission.

Figure 13A:
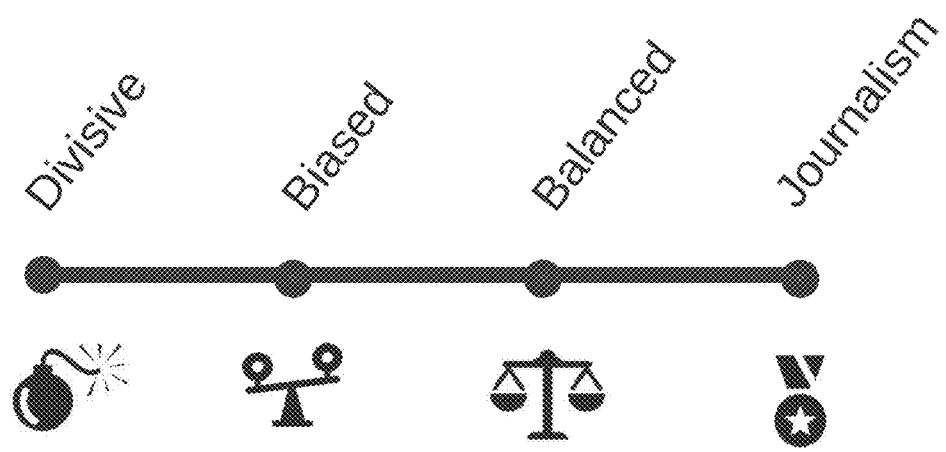
FIG. 13A depicts an example of a one-dimensional scale that a community member can use to evaluate an intent of an author that has created content in a knowledge object.

In a preferred embodiment, registered community member not only evaluate the MESSAGE but they can also add their interpretations of the MESSENGER INTENT on a linear scale as shown in FIG. 13A. This preferred scale mirrors the self-rating levels of MESSENGER INTENT that were provided to the submitting community member in prior examples and figures (except a single linear scale is now used as opposed to the multiple checkbox inputs as previously shown in the examples).

Preferably, when a community member rates MESSENGER INTENT to be inappropriate (as shown in FIG. 13B), this is seen as a more serious infraction upon the author. In such a case, the community member must indicate the specific reason(s). In this example, the first check box 34 provides the first rationale and the second check box 35 suggests another rationale. Check box 35 requires the community member to provide a further explanation in the text box 36 provided.

Figure 9:
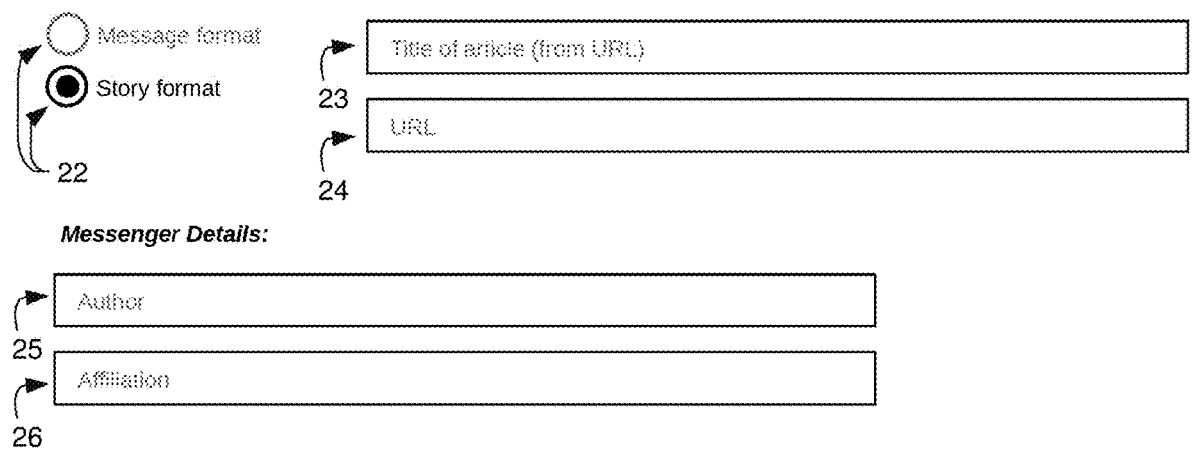
FIG. 9 depicts an input form that a community member can use to submit existing digital content as a knowledge object on the platform, in a story format, and affirm his or her good intentions in making the submission.

Finally, returning to the example shown in FIG. 9, the MESSAGE in this example is located at an external source (i.e., news story located at a specific URL address). As the submitting community member did not add any additional prose (the title 23 is expected to have come directly from the content located at the URL address 24), there is no MESSENGER INTENT related to the submitting community member. In this case, the MESSENGER INTENT to be evaluated by the community will be directed to the "good intentions" of the real author or authors 25, 26 of the MESSAGE 23, 24.

It is evident that implementations of the present disclosure may incorporate a wide variety of options, features, characteristics, and qualities that can be adapted to different environments in which platforms of the present disclosure are deployed. For instance, in a social media context, implementations of the disclosure may enable a community to evaluate information in knowledge objects in pursuit of a richer and deeper understanding of the "truth" of issues, events, people, etc. In a business context, implementations of the disclosure may enable a community of company personnel to evaluate business-related information, such as effectiveness of advertising campaigns, the value of existing or new products to be developed, opportunities to expand the business, targets for business development, competitive analyses, who should be hired for particular positions, etc.

By way of summary, platforms implemented according to the disclosure may include any one or combination of the following aspects:
  Stored digital content (as part of a larger collection of stored digital content). For clarity, this includes "agents";
  Multiple registered/attributable community members—ability to maintain reputations value (with community members caring about their reputations), wherein implications exist to a registered community member for behaviors judged by their peers as beneficial or counter-productive;
  The ability for a community member to focus on or view a single digital content (a "central idea") in a knowledge object;
  The ability for a registered community member to provide a personal interpretation of MESSENGER INTENT as it relates to the central idea. Preferably, a community member can only provide a single interpretation per scale. If a registered community member is submitting "the central idea," it is preferred that the community member self-rate his or her "good intentions" in making the submission;
  The ability for a registered community member to provide an evaluation (i.e., a personal interpretation) of the MESSAGE as it relates to the central idea. Preferably, a community member can only provide a single evaluation per scale;
  Algorithms provide an assessment of confidence/credibility of MESSAGE INTENT and MESSAGE based on community member credibilities and all evaluations of MESSAGE INTENT, MESSAGE, and/or any other elements being interpreted/evaluated in the platform;
  A purposeful intention of truth, transparency, and good intentions (i.e., community members seeking to "reveal truth and bring clarity" to a subject); and
  A purposeful intent to "even out the playing field" in regards to how knowledge is produced and dispersed.

Additionally, as suggested by circumstances, platforms implemented according to the disclosure may include any one or combination of the following aspects:
  An ability for a registered community member to focus on specific parts of content (i.e., support the fragmented nature of knowledge);
  A purposeful intention to raise the quality of public discourse through multiple levers such as: reminders of what is preferred behavior on the platform to nudge community members towards "better behavior", requesting community members to purposefully acknowledge "good intentions" (i.e., confirm via checkbox) and therefore take greater responsibility for their contributions, and/or game-ifying the process so community members are aware of and can benefit/improve their reputation value and "social standing" with "better behavior.";
  A purposeful intent to push community members into self-awareness of their interactions with the platform; and
  A purposeful intent to appreciate the complexity of a situation (as opposed to "all-or-nothing" thinking).

As described above, implementations of the present disclosure are configured to allow registered community members to evaluate the meaning of a knowledge object that has been created on the platform. Knowledge objects may include, but are not limited to, ideas, agents, links between ideas, links between an idea and an agent, links between agents, comments, etc.

In context of various embodiments of the present disclosure, ideas are embodied as digital content. Such digital content may be created by members of the community using the platform, or by others outside of the platform. For example, ideas may be written or audiovisual works (or any combination thereof) such as "news stories," which may be accessible, for example, at a web address or URL on the Internet. Other examples of ideas may be forms of social media posts, including for example "tweets" posted to Twitter.

Once a knowledge object is created on the platform, community members may evaluate the knowledge object according to one or more scales as discussed above. Various implementations of the disclosure may guide community members in evaluating the knowledge object, e.g., by evaluating the intent of the author of the content in the knowledge object (e.g., on a one dimensional scale, such as shown in FIG. 13A), and further evaluating the meaning of the content (e.g., on a 2×2 matrix, such as shown in FIG. 1, with the x-axis representing a measure of the content being "logical and consistent" and the y-axis representing a measure of the content showing "respect and kindness," as discussed earlier herein.

Alternatively, or in addition, knowledge objects may be agents (e.g., specific persons and/or organizations). Various implementations of the disclosure may guide community members in evaluating the agent (person or organization), e.g., on a 2×2 matrix as shown in FIG. 1, with the x-axis indicating a measure of the agent being "logical and consistent," and the y-axis indicating a measure of the agent showing "respect and kindness."

Alternatively, or in addition, knowledge objects may be links between two or more ideas embodied as knowledge objects on the platform. For example, a community member may evaluate a link of this type by specifying the degree to which the linked knowledge objects, in the community member's view, support or oppose one another, e.g., on a one dimensional scale, with a Boolean "reversed" parameter that helps specify the direction of the cause-effect between the linked knowledge objects. In another example, a community member may evaluate a link of this type by specifying the degree to which the linked knowledge objects, in the community member's view, are similar or related to one another.

Alternatively, or in addition, knowledge objects may be links between an idea and an agent. A community member may evaluate a link of this type on a one dimensional scale by specifying, for example, the degree to which the linked knowledge object and agent, in the community member's view, support or oppose one another.

Alternatively, or in addition, knowledge objects may be links between two (or more) agents. A community member may evaluate a link of this type on a one dimensional scale by specifying, for example, the degree to which the linked agents, in the community member's view, support or oppose one another, or the degree to which the linked agents are similar or related.

Alternatively, or in addition, knowledge objects may be comments made by community members relative to other knowledge objects. In some cases, a comment to a knowledge object may itself become knowledge object itself, and therefore the link between the comment and original knowledge object begins to behave as a link between two knowledge objects, as discussed above.

Broadly following the principles of "wisdom of crowds", the consensus of community member evaluations of a knowledge object creates a more credible or trusted meaning of the knowledge object for the community members. Registered community members who consistently contribute to quality evaluations of knowledge object (i.e., community members whose individual evaluations helped elevate the shared or consensus community understanding of the knowledge object) will be rewarded with a higher reputation value in the community (and therefore, will have greater influence within the community. Indeed, it is envisioned that community members with high reputation values may proudly display their reputation values as a "peer reviewed" measure of their thought leadership, which may benefit them in other aspects of their life, for example in employment, contract, education, etc., opportunities.

The platform of the present disclosure thus enables evaluations of knowledge objects (ideas, agents, comments, idea-idea links, agent-agent links, or idea-agent links) by different community members to work together to create deeper meaning and better understanding.

Features and advantages of the invention as described in the present disclosure can be achieved in a wide variety of implementations. By way of examples, FIGS. 14A-17 illustrate various implementations that employ the innovative principles of the present disclosure. In particular, these examples describe the manner in which various platforms may be operated to determine a consensus evaluation of a knowledge object and how the reputation values of contributing community members are impacted by the consensus evaluation.

Example 1

In a first example as shown in FIGS. 14A-14E, a programmed computer is configured to receive submissions from a plurality of community members with regard to a knowledge object. As will be seen, each community member has a reputation value that is attributed to the community member. Furthermore, each community member's submission regarding the knowledge object includes an evaluation value representing an evaluation of the knowledge object by the community member.

The community members are asked to evaluate the meaning of the knowledge object on a one-dimensional scale. In this example, the knowledge object is an "idea" knowledge object. For illustration purposes, this one-dimensional scale is intended to elicit a measure of "truth" of the knowledge object, though in other implementations, other characteristics or qualities of a knowledge object may be evaluated. In this example, the programmed computer is operating a platform that determines a consensus evaluation of the knowledge object based on a calculated combination of the evaluation values in the submissions received from the community members and the reputation values of the respective community members who submitted the submissions.

As will be illustrated in FIGS. 14A-14E, the programmed computer (i.e., the platform) is configured to iteratively update the consensus evaluation of the knowledge object while submissions are being received from community members regarding the knowledge object. Additionally, over the course of receiving the submissions from the community members, the programmed computer iteratively updates the reputation value for each community member who submitted the submissions. In these examples, for simplicity, the reputation of community members will be held constant throughout the example; however, the potential impact to the community member reputations will be shown.

At each iteration of updating the consensus evaluation of the knowledge object, the programmed computer calculates the updated consensus evaluation based on submissions received from community members up to that time, that is up to the time of each iterative calculation, including submissions that have been received by the programmed computer since a previous updating of the consensus evaluation. As will be seen by way of example below, the updated consensus evaluation is a calculated combination of the evaluation values in the submissions received and the reputation values of the respective community members who submitted the submissions.

Further, at each iteration, the programmed computer updates the reputation value for each community member who submitted the submissions. In these examples, only the potential/future impact to reputation values is shown. An updated reputation value for each community member may be calculated based on a determined contribution of the respective community member's submission to the updated consensus evaluation.

In accordance with principles of the present disclosure, the reputation value of a community member is enhanced to a degree that the evaluation value submitted by the community member causes the updated consensus evaluation to become closer to a final consensus evaluation of the knowledge object. On the other hand, the reputation value of a community member is diminished to a degree that the evaluation value submitted by the community member causes the updated consensus evaluation to be farther from the final consensus evaluation of the knowledge object.

FIGS. 14A-14E provide an overview (in a spreadsheet format) of at least one implementation of a platform that iteratively determines updated consensus evaluations and reputation values. FIG. 14A, in particular, illustrates a first iteration of calculations performed by the platform after a first community member has provided his or her evaluation of the knowledge object to the platform, and FIGS. 14B-14E illustrate successive iterations of calculations performed by the platform after additional community members have each provided their evaluations of the knowledge object. The significance of the values shown in each column of the spreadsheet is described in further detail below.

Column A: Community Member (CM) #. FIG. 14A shows the calculations performed by the platform after receiving a first CM evaluation, in row 4. By the end of this example, five community members will each have sequentially evaluated the "truth" level of the knowledge object. Each successive submission by the community members is shown sequentially in FIGS. 14B, 14C, 14D, and 14E.

Column B: Community Member Reputation (CM.REPUTATION). Each community member has a "reputation" value that is a measure of the level of trust of this community member. In this example, the value of CM.REPUTATION ranges from 0 to 1. For simplicity, CM.REPUTATION in this example is shown remaining at a fixed level. However, in a preferred embodiment, CM.REPUTATION will be updated iteratively as each community member interacts with the platform and gains or loses credibility, through ongoing interactions by the respective community member and others, and through updates to the community member's credibility as "truth" is revealed over time by the consensus evaluations of the community and scoring of past CM evaluations are updated. In this example, while the calculated impact to each CM's reputation is not shown applied to the CM's reputation value, it is expected that, at some point, each CM's individual reputation value will be adjusted according to the respective calculated impact of their submission to their reputation.

Column C: This column stores CM's evaluation (CMS.EVAL) of the truthfulness of the idea in the knowledge object. In this example, the value of CMS.EVAL ranges from 0 to 1, with "1" being the highest possible level of trust by the community member and "0" meaning no trust by the community member in the truth of the idea.

Column D: This column stores CM's confidence (CMS.CONFID) in the evaluation value that the community member submitted in his or her submission. In a preferred embodiment of this disclosure, the community member is provided three choices (e.g., in the form of three buttons) when submitting an evaluation of a knowledge object. When a CM submits an evaluation, selecting an "I guess" button maps to CMS.CONFID=0.1, selecting an "I think so" button maps to CMS.CONFID=0.5, and selecting an "I know" button maps to CMS.CONFID=1.0. In many ways, the value of CMS.CONFID may be thought as a "level of bet" of the community member that he or she is right in their evaluation of the truth of the knowledge object, that is, how close their evaluation is to the ultimate truth of the knowledge object, which is determined by consensus of the community. Implementations of the disclosure in this regard may be considered somewhat similar to a betting game or a betting market. Big(ger) CMS.CONFID "bets" by a community member (i.e., a community member whose submission indicates a high confidence value in their evaluation) can produce a greater influence on the "meaning" of the knowledge object and reap greater potential rewards (or damage) to the community member's reputation, depending on the community's ultimate consensus evaluation of the knowledge object and how it aligns with the individual community member's submitted evaluation.

Column E: The value CE.AS is a calculated consensus evaluation value derived from the evaluation values including all community member submissions received up until, and at the time of, the current submission. In a preferred embodiment, the platform calculates CE.AS immediately after each CM submission. CE.AS takes into consideration all CM evaluations, and calculates a consensus value (here, a weighted average) by taking into consideration CM.REPUTATION, CMS.EVAL, and CMS.CONFID. At the outset, prior to any community member submission, the platform may start CE.AS at "neutral" value, in this case, 0.5. (See cell E3.)

Column F: The value CE.BS is the calculated consensus evaluation value derived from all submissions at the time immediately before the current community member's submission. Essentially, column F contains the same values as column E, except column F is shifted down one row.

Column G: The value CE.EBM is also a calculated consensus evaluation value, similar to CE.AS. CE.EBM takes into consideration the evaluation values in all submissions BUT it does not take into consideration the current community member's submission. Hence, in this illustration, CE.EBM is designated as a consensus evaluation by "everyone but me." Like CE.AS, CE.EBM takes into consideration submissions received before the current CM submission. However CE.EBM also takes into consideration all submissions after the current CM submission; that is, for each submission the value CE.EBM is recalculated as future submissions are received.

Column H: This column includes a calculation of the mathematical distance between the current CM's submission (CMS.EVAL) and the platform's best estimate of truth at the time of the submission (which is the community's consensus evaluation CE.BS at the time of the current CM's submission).

$$DistanceFromBS=abs(CMS.EVAL-CE.BS)$$

Column I: This column includes a calculation of the mathematical distance between the current CM's submission (CMS.EVAL) and the latest consensus evaluation of truth in "everyone else's submissions but me" (CE.EBM).

$$DistanceFromNow=abs(CMS.EVAL-CE.EBM)$$

Column J: This column provides a measure of the amount of positive (or negative) impact that the current CM contributed to the most recently calculated consensus evaluation of the knowledge object. The most recently calculated consensus evaluation is considered to be the "final" consensus evaluation as it is the last calculated consensus evaluation, at least at that time. Conceptually, implementations of the present disclosure reward a community member if their submission (CMS.EVAL) is closer to "the final consensus evaluation" (ignoring CM's submission) versus "the consensus evaluation before CM submitted."

$$CM's\ Contribution=DistanceFromBS-DistanceFromNow$$

Positive values mean the community member's evaluation has had a positive influence towards the final consensus evaluation, and the community member's reputation will gain credibility accordingly. Negative values mean the community member's evaluation has had a negative influence on the final consensus evaluation, and the community member's reputation will lose credibility accordingly.

Column K: This column provides a measure of the amount that a CM's reputation value will increase (or decrease) based on the accuracy (or inaccuracy) of CM's evaluation of the knowledge object (as compared to the final consensus evaluation), weighted by the confidence that the CM placed in their evaluation of the knowledge object.

Impact=CM's Contribution (Column *J*)*CMS.CON-FID

In FIG. 14A, row 4 shows the consensus evaluation before submission equaling 0.5 (cell F4), as no other community member has previously submitted. After CM #1's submission, the consensus evaluation equals 0.64 (cell E4) which, as expected, matches CM #1's submission (cell C4), as being the only submission received so far. As the two distances (cells H4 and I4) are equal at this time, the platform calculates no measurable contribution related to this community member's evaluation of the knowledge object or impact on the reputation of CM #1.

In FIG. 14B, row 5 shows a second CM submission in which CM #2 submitted an evaluation value CMS.EVAL of 0.4 (cell C5), with a "middle ground" confidence value CMS.CONFID of 0.5 (cell D5). Row 5 also shows the consensus average evaluation before CM #2's submission to be 0.64 (cell F5) which, as one would expect, matches the final consensus average evaluation from FIG. 14A. After receiving CM #2's submission, the consensus evaluation (CE.AS) is calculated in cell E5:

$$E5 = (B4*C4*D4 + B5*C5*D5)/(B4*D4 + B5*D4)$$
$$= (0.7*0.64*0.1 + 0.4*0.4*0.5)/(0.7*0.1 + 0.4*0.5) = 0.46$$

Also, the consensus evaluation (CE.EBM) is calculated in cell G5, in this case as a weighted average, including all contributions except CM #2's submission:

$$G5 = ((B4*C4*D4 + B5*C5*D5) - B5*C5*D5)/$$
$$((B4*D4 + B5*D5) - B5*D5)$$
$$= ((0.7*0.64*0.1 + 0.4*0.4*0.5) - 0.4*0.4*0.5)/$$
$$((0.7*0.1 + 0.4*0.5) - 0.4*0.5) = 0.64$$

Returning back to CM #1's submission, CE.EBM (cell G4) has changed from 0.5 to 0.4. The consensus evaluation (CE.EBM) in cell G4 is re-calculated, in this case as a weighted average, including all contributions except CM #1's submission:

$$G4=((B4*C4*D4+B5*C5*D5)-B4*C4*D4)/$$
$$((B4*D4+B5*D5)-B4*D4)=$$
$$((0.7*0.64*0.1+0.4*0.4*0.5)-0.7*0.64*0.1)/$$
$$((0.7*0.1+0.4*0.5)-0.7*0.1)=0.4$$

One can also see that the value in cell I4 has increased from 0.14 to 0.24, which now shows CM #1's submission to have a negative contribution to final consensus evaluation of the knowledge object (and negative impact to CM #1's reputation). Conceptually, CM #1's submission (CMS.EVAL, cell C4) now finds itself further away from the latest consensus evaluation (cell G4) than the consensus evaluation that was calculated before the current CM's submission (CE.BS, cell F4), and therefore is seen (at least at this early stage) as non-positively-contributing to the knowledge object evaluation.

FIGS. 14C-14E illustrate successive receipt of additional submissions from CM #3, CM #4, and CM #5, and the iterative updating of the consensus evaluation and impact on reputation that occurs, in this case with each submission. The algorithms and formulas discussed above with regard to FIGS. 14A and 14B for calculating the values shown are similarly used in calculating the values shown in FIGS. 14C-14E. In FIGS. 14C-14E, the range of values used in the formulas to calculate the values shown are expanded to take into account the reputation values, evaluation values, and confidence values included in the newly-received submissions, as they occur.

FIG. 14C shows a third CM submission in which CM #3 submitted a relatively low evaluation value CMS.EVAL of 0.1 (cell C6), which further brings down the consensus evaluation of the knowledge object. At this stage, CE.AS now equals 0.36 (see cell E6). With an understanding of how these calculations reward or penalize community members for their prior submissions, it is not surprising to see CM #1 further penalized (cells J4 and K4) for CM #1's relatively high CMS.EVAL of 0.64 (cell C4) while, at this time, CM #2 is rewarded (cells J5 and K5) for a seemingly more accurate evaluation CMS.EVAL of 0.4 (cell C5) that is closer to the most recent ("final") consensus evaluation.

FIG. 14D shows a fourth CM submission in which CM #4 submitted a relatively high evaluation value CMS.EVAL of 0.85 (cell C7), which brings up the consensus evaluation of the knowledge object. At this stage, CE.AS now equals 0.40 (see cell E7). One might expect such a high CMS.EVAL of 0.85 (cell C7) from CM #4 to have a greater impact on the consensus evaluation CE.AS; however, CM #4's confidence CMS.CONFID in his or her evaluation value was only 0.1 (cell D7) and CM #4's reputation value CM.REPUTATION is relatively low (0.3, see cell B7).

FIG. 14E shows a fifth CM submission in which CM #5 submitted a relatively high CMS.EVAL (0.8, see cell C8), which brings up the consensus evaluation of the knowledge object. At this stage, CE.AS now equals 0.53 (see cell E8). Not unexpectedly, CM #3 now is shown to be a negative contributor to the evaluation of this knowledge object due to his or her low CMS.EVAL of 0.1 (cell C6), which is now appearing out-of-step with the greater community's consensus evaluation CE.AS.

Example 2

FIG. 15 provides an overview (in a spreadsheet format) of another implementation of a platform that, similar to implementation shown in FIGS. 14A-14E, iteratively determines updated consensus evaluations and reputation values while receiving submissions from community members. The example shown in FIG. 15 builds on Example 1. Instead of using one-dimensional scale to evaluate a knowledge object as in Example 1, with Example 2, community member evaluations relate to a 2×2 matrix with two coordinates: x and y. One non-limiting example of a 2×2 matrix that can be used for community member evaluations of a knowledge object is shown and described above in relation to FIG. 1. As previously described, this 2×2 matrix in FIG. 1 may be used to evaluate an "idea" knowledge object, in which an evaluation value on the x-axis represents the degree to which a community member considers the content of the knowledge object to be "logical and consistent" and an evaluation value on the y-axis represents the degree to which the community member considers the content to express "respect and kindness."

Thus, in FIG. 15, CE.AS.X is the consensus evaluation of all x-scale submissions by community members received up until, and at the time of, the current submission. CE.AS.Y is the consensus evaluation of all y-scale submissions by community members received up until, and at the time of, the current submission.

CE.BS.X is the consensus evaluation of all x-scale submissions at the time immediately before the current community member's submission. Essentially, column H contains the same values as column F, except column H is shifted down one row.

CE.BS.Y is the consensus evaluation of all y-scale submissions at the time immediately before the current community member's submission. Essentially, column I contains the same values as column G, except column I is shifted down one row.

CE.EBM.X is also a calculated consensus evaluation value, similar to CE.AS.X. CE.EBM.X takes into consideration the evaluation values in all submissions BUT it does not take into consideration the current community member's submission. Hence, in this illustration, CE.EBM.X is designated as a consensus evaluation by "everyone but me." Like CE.AS.X, CE.EBM.X takes into consideration submissions received before the current CM submission. However CE.EBM.X also takes into consideration all submissions after the current CM submission; that is, for each submission the value CE.EBM.X is recalculated as future submissions are received.

CE.EBM.Y is similar to CE.EBM.X, except focused on the y-scale.

Column L: In this example, the platform seeks to calculate a distance between points with two coordinates, so for this column, the platform uses the Pythagorean theorem to calculate the mathematical distance between the current CM's submission (CMS) and the platform's best estimate of a consensus value at the time of the submission (CE.BS).

DistanceFromBS=sqrt((CMS.$X$−CE.BS.$X$)*(CMS.$X$−CE.BS.$X$)+

(CMS.$Y$−CE.BS.$Y$)*(CMS.$Y$−CE.BS.$Y$))

Column M: Similar to the column L calculations above, this distance is calculated:

DistanceFromNow=sqrt((CMS.$X$−CE.EBM.$X$)*(CMS.$X$−CE.EBM.$X$)+

(CMS.$Y$−CE.EBM.$Y$)*(CMS.$Y$−CE.EBM.$Y$))

Implementations of the present disclosure using more than two scales may use standard multi-dimensional equations known in the art to calculate distances between points with multi-coordinates.

Columns N and O in Example 2 parallel the prior descriptions provided for columns J and K in Example 1.

Example 3

FIG. 16 provides an overview (in a spreadsheet format) of yet another implementation of a platform that, similar to the implementations shown in Examples 1 and 2, iteratively determines updated consensus evaluations and reputation values while receiving submissions from community members. The example shown in FIG. 16 builds on Examples 1 and 2. Instead of evaluating a knowledge object using only a single one-dimensional scale (as in Example 1) or a single 2×2 matrix (as in Example 2), this example (Example 3) shows an implementation of a platform in which community members use both a one-dimensional scale and a 2×2 matrix to evaluate a knowledge object. The platform in Example 3 may use algorithms and formulas similar to those used in Examples 1 and 2, but adjusted to account for the additional evaluation values received from each community member according to the one-dimensional scale and the 2×2 matrix employed. Furthermore, these algorithms and formulas may implement logic previously described for use with evaluating "idea" knowledge objects, namely (for example) a one-dimensional scale is used to evaluate the intent of the author of the "idea" (i.e., "messenger intent") and a 2×2 matrix is used to evaluate the content of the "idea" (i.e. the "message"). In the 2×2 matrix, the x-axis may represent the degree to which the community member considers the content to be "logical and consistent" and the y-axis may represent the degree to which the community member considers the content to express "respect and kindness."

In this particular example, the submission from CM #3 shows that CM #3 thinks poorly of the intent of the message author (CMS.INTENT=0.1, see cell C6). If CMS.INTENT is evaluated to be below "an acceptable threshold" by a community member, CM #3 is not provided an opportunity to submit an evaluation of the content on the 2×2 matrix. In this case, the 2×2 matrix evaluation values CMS.X and CMS.Y are both set to 0 by default.

Example 4

FIG. 17 provides an overview (in a spreadsheet format) of still another implementation of a platform that, similar to the implementations shown in Examples 1-3, iteratively determines updated consensus evaluations and reputation values while receiving submissions from community members. The example shown in FIG. 17 shows sample calculations when linking two idea knowledge objects, through the creation of a Link Knowledge Object (LKO). Such LKO's in this example have a support/cause scale (CMS.SCALE) ranging from 0 to 1, with 0.5 being neutral (neither supports nor causes the other) and a Boolean value (CMS.REVERSE) being either 0 (cause-effect direction is "as shown") or 1 (cause-effect direction is reversed from "as shown").

Previously, as illustrated in FIG. 2C, an LKO was shown and described to have a support/oppose scale, a reverse cause/effect direction (Boolean value), and a similarity/relatedness scale. If a fourth scale (i.e., similarity/relatedness scale) were added to Example 4, this example would mirror the four scales shown in FIG. 2C.

With the foregoing description in mind, the present disclosure has demonstrated the value of methods and systems for distributed cognition of digital content that are comprised of knowledge objects. In various implementations, methods and systems constructed according to principles of the present disclosure may include receiving, by a programmed computer, submissions from a plurality of community members with regard to a knowledge object, wherein each community member has a reputation value that is attributed to the community member, and each community member's submission regarding the knowledge object includes an evaluation value representing an evaluation of the knowledge object by the community member. The method further includes determining, by the programmed computer, a consensus evaluation of the knowledge object based on a calculated combination of the evaluation values in the submissions received and the reputation values of the respective community members who submitted the submissions.

While the programmed computer is receiving submissions from community members, the programmed computer is configured to iteratively update the consensus evaluation of the knowledge object to produce an updated consensus evaluation. The updated consensus evaluation is calculated based on submissions received from community members up to each iteration including submissions received since a previous updating of the consensus evaluation. The updated consensus evaluation is a calculated combination of the evaluation values in the submissions received and the reputation values of the respective community members who submitted the submissions. The programmed computer is further configured to iteratively update the reputation value for each community member who submitted the submissions to produce an updated reputation value. The updated reputation value for each community member is calculated based on a determined contribution of the respective community member's submission to the updated consensus evaluation, In this manner, the reputation value of a community member is enhanced to a degree that the evaluation value submitted by the community member causes the updated consensus evaluation to become closer to a final consensus evaluation of the knowledge object. Likewise, the reputation value of a community member is diminished to a degree that the evaluation value submitted by the community member causes the updated consensus evaluation to be farther from the final consensus evaluation of the knowledge object.

Methods and systems of the present disclosure may include any one or combination of the following features, in which: the final consensus evaluation of the knowledge object at an instance of time is the most recently updated consensus evaluation; the consensus evaluation of the knowledge object is iteratively updated after receipt of each community member's submission; the reputation value for a community member includes calculating a first mathematical distance between the evaluation value in the respective community member's submission and the consensus evaluation of the knowledge object that was previously calculated before the respective community member's submission; updating the reputation value for a community member further includes calculating a second mathematical distance between the evaluation value in the respective community member's submission and a consensus evaluation of the knowledge object determined using other community members' evaluation values and excluding the respective community member's evaluation value; the contribution of a respective community member's submission to the updated consensus evaluation is calculated based on a difference between the first mathematical distance and the second mathematical distance; each community member's submission further includes a confidence value representing a level of confidence by the community member that the evaluation value in the community member's submission is indicative of a future final consensus evaluation of the knowledge object; and/or a respective community member's reputation value is enhanced or diminished based on the contribution of the respective community member's submission to the updated consensus evaluation weighted by the level of confidence by the community member included in the community member's submission.

Methods and systems of the present disclosure may alternatively, or further, include any one or combination of the following features: the evaluation value in a community member's submission represents the community member's evaluation of an intent of an author of the knowledge object; precluding a community member from submitting a submission if the community member's evaluation of the intent of the author is below an acceptable threshold; the evaluation value in a community member's submission is a first evaluation value that represents the community member's evaluation of a first aspect of the knowledge object, wherein the community member's submission includes a second evaluation value representing the community member's evaluation of a second aspect of the knowledge object; the second evaluation value in a community member's submission represents the community member's evaluation of a message content conveyed by the knowledge object; the community member's evaluation of the message content includes an evaluation of competence of the message content; the community member's submission includes a third evaluation value representing the community member's evaluation of warmth of the message content; the knowledge object includes a link to another knowledge object, and the evaluation value in a community member's submission represents an evaluation of the link by the community member; the link to another knowledge object represents a cause and effect relationship between the respective knowledge objects, and the evaluation value in the community member's submission represents an evaluation of the cause and effect relationship by the community member; the knowledge object is an agent capable of creating a message content, and the evaluation value in a community member's submission represents an evaluation of the agent by the community member; the knowledge object includes evidence that either supports or opposes another knowledge object, and the evaluation value in a community member's submission represents an evaluation of the evidence by the community member; the programmed computer requires a community member to self-evaluate original content in their submission before allowing to the community member to submit the submission; and/or reporting at least one of the updated consensus evaluation of the knowledge object or the updated reputation value of at least one community member.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for distributed cognition of digital content comprised of knowledge objects, the method comprising:
    receiving, by a programmed computer, submissions from a plurality of community members with regard to a knowledge object, wherein each community member has a reputation value that is attributed to the community member, and each community member's submission regarding the knowledge object includes an evaluation value representing an evaluation of the knowledge object by the community member;

determining, by the programmed computer, a consensus evaluation of the knowledge object based on a calculated combination of the evaluation values in the submissions received and the reputation values of the respective community members who submitted the submissions; and while submissions are being received from community members regarding the knowledge object, by the programmed computer:

iteratively updating the consensus evaluation of the knowledge object to produce an updated consensus evaluation, wherein the updated consensus evaluation is calculated based on submissions received from community members up to each iteration including submissions received since a previous updating of the consensus evaluation, the updated consensus evaluation being a calculated combination of the evaluation values in the submissions received and the reputation values of the respective community members who submitted the submissions; and iteratively updating the reputation value for each community member who submitted the submissions to produce an updated reputation value, wherein the updated reputation value for each community member is calculated based on a determined contribution of the respective community member's submission to the updated consensus evaluation, wherein the reputation value of a community member is enhanced to a degree that the evaluation value submitted by the community member causes the updated consensus evaluation to become closer to a final consensus evaluation of the knowledge object, wherein the reputation value of a community member is diminished to a degree that the evaluation value submitted by the community member causes the updated consensus evaluation to be farther from the final consensus evaluation of the knowledge object, and wherein updating the reputation value for a community member includes calculating a first mathematical distance between the evaluation value in the respective community member's submission and the consensus evaluation of the knowledge object.

2. The method of claim 1, wherein the final consensus evaluation of the knowledge object at an instance of time is the most recently updated consensus evaluation.

3. The method of claim 1, wherein the consensus evaluation of the knowledge object is iteratively updated after receipt of each community member's submission.

4. The method of claim 1, wherein the consensus evaluation of the knowledge object used in calculating the first mathematical distance was previously calculated before the respective community member's submission.

5. The method of claim 4, wherein updating the reputation value for a community member further includes calculating a second mathematical distance between the evaluation value in the respective community member's submission and a consensus evaluation of the knowledge object determined using other community members' evaluation values and excluding the respective community member's evaluation value.

6. The method of claim 5, wherein the contribution of a respective community member's submission to the updated consensus evaluation is calculated based on a difference between the first mathematical distance and the second mathematical distance.

7. The method of claim 6, wherein each community member's submission further includes a confidence value representing a level of confidence by the community member that the evaluation value in the community member's submission is indicative of a future final consensus evaluation of the knowledge object.

8. The method of claim 7, wherein a respective community member's reputation value is enhanced or diminished based on the contribution of the respective community member's submission to the updated consensus evaluation weighted by the level of confidence by the community member included in the community member's submission.

9. The method of claim 1, wherein the evaluation value in a community member's submission represents the community member's evaluation of an intent of an author of the knowledge object.

10. The method of claim 9, further comprising precluding a community member from submitting a submission if the community member's evaluation of the intent of the author is below an acceptable threshold.

11. The method of claim 1, wherein the evaluation value in a community member's submission is a first evaluation value that represents the community member's evaluation of a first aspect of the knowledge object, and wherein the community member's submission includes a second evaluation value representing the community member's evaluation of a second aspect of the knowledge object.

12. The method of claim 11, wherein the second evaluation value in a community member's submission represents the community member's evaluation of a message content conveyed by the knowledge object.

13. The method of claim 12, wherein the community member's evaluation of the message content includes an evaluation of competence of the message content.

14. The method of claim 13, wherein the community member's submission includes a third evaluation value representing the community member's evaluation of warmth of the message content.

15. The method of claim 1, wherein the knowledge object includes a link to another knowledge object, and the evaluation value in a community member's submission represents an evaluation of the link by the community member.

16. The method of claim 15, wherein the link to another knowledge object represents a cause and effect relationship between the respective knowledge objects, and the evaluation value in the community member's submission represents an evaluation of the cause and effect relationship by the community member.

17. The method of claim 1, wherein the knowledge object is an agent capable of creating a message content, and the evaluation value in a community member's submission represents an evaluation of the agent by the community member.

18. The method of claim 1, wherein the knowledge object includes evidence that either supports or opposes another knowledge object, and the evaluation value in a community member's submission represents an evaluation of the evidence by the community member.

19. The method of claim 1, wherein the programmed computer requires a community member to self-evaluate original content in their submission before allowing to the community member to submit the submission.

20. The method of claim 1, wherein the method further comprises reporting at least one of the updated consensus evaluation of the knowledge object or the updated reputation value of at least one community member.

\* \* \* \* \*